(12) United States Patent
Tokishige

(10) Patent No.: US 10,732,988 B2
(45) Date of Patent: Aug. 4, 2020

(54) REBOOT CONTROL SYSTEM

(71) Applicant: SHARP KABUSHIKI KAISHA, Sakai, Osaka (JP)

(72) Inventor: Masato Tokishige, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 87 days.

(21) Appl. No.: 16/182,526

(22) Filed: Nov. 6, 2018

(65) Prior Publication Data

US 2019/0138321 A1  May 9, 2019

(30) Foreign Application Priority Data

Nov. 7, 2017 (JP) ................................. 2017-214607

(51) Int. Cl.
*G06F 9/44* (2018.01)
*G06F 9/48* (2006.01)
*G06F 11/30* (2006.01)
*G06F 9/4401* (2018.01)

(52) U.S. Cl.
CPC .......... *G06F 9/4416* (2013.01); *G06F 9/4887* (2013.01); *G06F 11/3006* (2013.01)

(58) Field of Classification Search
CPC ... G06F 9/4416; G06F 9/4887; G06F 11/3006
See application file for complete search history.

(56) References Cited

U.S. PATENT DOCUMENTS 10,338,651 B2 * 7/2019 Brown ................ G06F 11/3051

FOREIGN PATENT DOCUMENTS

| JP | 2009-075635 A | 4/2009 |
| JP | 2012-174220 A | 9/2012 |

* cited by examiner

*Primary Examiner* — Stefan Stoynov
(74) *Attorney, Agent, or Firm* — ScienBiziP, P.C.

(57) ABSTRACT

A reboot control system includes an information processing device and a reboot management device connected over a network. The reboot management device includes a first storage unit that stores device management information including information related to each information processing device, a reboot time setting unit that sets a reboot time, and a reboot time notification unit that transmits the set reboot time to each information processing device. The information processing device includes a reboot information acquisition unit that acquires the transmitted reboot time, and a reboot execution unit that executes a reboot at the acquired reboot time. The reboot time setting unit takes Into account a positional relationship of multiple information processing devices existing in a predetermined neighboring relationship to set the reboot times of the multiple information processing devices existing in the predetermined neighboring relationship to mutually different times.

12 Claims, 20 Drawing Sheets

FIG. 6

| MFP NAME | MFP ID | STORE NAME | NO. OF NEIGHBORING MFPS | NEIGHBORING MFP ID(S) |
|---|---|---|---|---|
| MFP01 | 100100 | SP01 | 0 | |
| MFP02 | 200200 | SP02 | 0 | |
| MFP03 | 300300 | SP03 | 0 | |
| MFP04 | 400400 | SP04 | 1 | 500500 |
| MFP05 | 500500 | SP05 | 1 | 400400 |
| MFP06 | 600600 | SP06 | 0 | |
| --- | --- | --- | --- | --- |
| MFP90 | 900090 | SP90 | 2 | 900091 , 900092 |
| MFP91 | 900091 | SP91 | 2 | 900090 , 900092 |
| MFP92 | 900092 | SP92 | 2 | 900090 , 900091 |

FIG. 7A

| MFP NAME | MFP ID | STORE NAME | REBOOT TIME | OFFSET TIME |
|---|---|---|---|---|
| MFP01 | 100100 | SP01 | 0 | 0 |
| MFP02 | 200200 | SP02 | 0 | 0 |
| MFP03 | 300300 | SP03 | 0 | 0 |
| MFP04 | 400400 | SP04 | 0 | 0 |
| MFP05 | 500500 | SP05 | 0 | 0 |
| MFP06 | 600600 | SP06 | 0 | 0 |
| ⋮ | ⋮ | ⋮ | ⋮ | ⋮ |

FIG. 7B

| MFP NAME | MFP ID | STORE NAME | REBOOT TIME | OFFSET TIME |
|---|---|---|---|---|
| MFP01 | 100100 | SP01 | 05/05/2017 03:00 | 0 |
| MFP02 | 200200 | SP02 | 05/05/2017 03:00 | 0 |
| MFP03 | 300300 | SP03 | 05/05/2017 03:00 | 0 |
| MFP04 | 400400 | SP04 | 05/05/2017 03:00 | 0 |
| MFP05 | 500500 | SP05 | 05/05/2017 03:00 | 0 |
| MFP06 | 600600 | SP06 | 05/05/2017 03:00 | 0 |
| ⋮ | ⋮ | ⋮ | ⋮ | ⋮ |

FIG. 8A

| MFP NAME | MFP ID | STORE NAME | REBOOT TIME | OFFSET TIME |
|---|---|---|---|---|
| MFP01 | 100100 | SP01 | 05/05/2017 03:00 | 0 |
| MFP02 | 200200 | SP02 | 05/05/2017 03:00 | 0 |
| MFP03 | 300300 | SP03 | 05/05/2017 03:00 | 0 |
| MFP04 | 400400 | SP04 | 05/05/2017 03:00 | 0 |
| MFP05 | 500500 | SP05 | 05/05/2017 03:00 | 0 |
| MFP06 | 600600 | SP06 | 05/05/2017 03:00 | 0 |
| ⋮ | ⋮ | ⋮ | ⋮ | ⋮ |

FIG. 8B

| MFP NAME | MFP ID | STORE NAME | REBOOT TIME | OFFSET TIME |
|---|---|---|---|---|
| MFP01 | 100100 | SP01 | 05/05/2017 03:00 | 0 |
| MFP02 | 200200 | SP02 | 05/05/2017 03:00 | 0 |
| MFP03 | 300300 | SP03 | 05/05/2017 03:00 | 0 |
| MFP04 | 400400 | SP04 | 05/05/2017 03:00 | 0 |
| MFP05 | 500500 | SP05 | 05/05/2017 03:30 | 30 |
| MFP06 | 600600 | SP06 | 05/05/2017 03:00 | 0 |
| ⋮ | ⋮ | ⋮ | ⋮ | ⋮ |

FIG. 9A

| MFP NAME | MFP ID | STORE NAME | REBOOT TIME | OFFSET TIME |
|---|---|---|---|---|
| MFP01 | 100100 | SP01 | 05/05/2017 03:00 | 0 |
| MFP02 | 200200 | SP02 | 05/05/2017 03:00 | 0 |
| MFP03 | 300300 | SP03 | 05/05/2017 03:00 | 0 |
| MFP04 | 400400 | SP04 | 05/05/2017 03:30 | 30 |
| MFP05 | 500500 | SP05 | 05/05/2017 03:00 | 0 |
| MFP06 | 600600 | SP06 | 05/05/2017 03:00 | 0 |
| ⋮ | ⋮ | ⋮ | ⋮ | ⋮ |

FIG. 9B

| MFP NAME | MFP ID | STORE NAME | REBOOT TIME | OFFSET TIME |
|---|---|---|---|---|
| MFP01 | 100100 | SP01 | 05/05/2017 03:00 | 0 |
| MFP02 | 200200 | SP02 | 05/05/2017 03:00 | 0 |
| MFP03 | 300300 | SP03 | 05/05/2017 03:00 | 0 |
| MFP04 | 400400 | SP04 | 05/05/2017 03:05 | 5 |
| MFP05 | 500500 | SP05 | 05/05/2017 03:30 | 30 |
| MFP06 | 600600 | SP06 | 05/05/2017 03:00 | 0 |
| ⋮ | ⋮ | ⋮ | ⋮ | ⋮ |

FIG. 10A

REBOOT INFORMATION STORED IN MFP01

| MFP NAME | MFP ID | RECEIVED REBOOT TIME | SCHEDULED REBOOT EXECUTION TIME |
|---|---|---|---|
| MFP01 | 100100 | 05/05/2017 03:00 | 05/05/2017 03:00 |

REBOOT INFORMATION STORED IN MFP02

| MFP NAME | MFP ID | RECEIVED REBOOT TIME | SCHEDULED REBOOT EXECUTION TIME |
|---|---|---|---|
| MFP02 | 200200 | 05/05/2017 03:00 | 05/05/2017 03:00 |

REBOOT INFORMATION STORED IN MFP04

| MFP NAME | MFP ID | RECEIVED REBOOT TIME | SCHEDULED REBOOT EXECUTION TIME |
|---|---|---|---|
| MFP04 | 400400 | 05/05/2017 03:00 | 05/05/2017 03:05 |

REBOOT INFORMATION STORED IN MFP05

| MFP NAME | MFP ID | RECEIVED REBOOT TIME | SCHEDULED REBOOT EXECUTION TIME |
|---|---|---|---|
| MFP05 | 500500 | 05/05/2017 03:00 | 05/05/2017 03:30 |

FIG. 10B

USAGE STATE INFORMATION STORED IN MFP01

| MFP NAME | MFP ID | USAGE STATE INFORMATION |
|---|---|---|
| MFP01 | 100100 | 0 (FUNCTION NOT BEING EXECUTED) |

USAGE STATE INFORMATION STORED IN MFP04

| MFP NAME | MFP ID | USAGE STATE INFORMATION |
|---|---|---|
| MFP04 | 400400 | 1 (FUNCTION BEING EXECUTED) |

FIG. 11

NEIGHBORING DEVICE INFORMATION STORED IN MFP01

| MFP NAME | MFP ID | MFP IP ADDRESS | REBOOT EXECUTION RANK | NO. OF NEIGHBORING MFPS | IP ADDRESS OF EACH NEIGHBORING MFP | ADJUSTMENT TIME |
|---|---|---|---|---|---|---|
| MFP01 | 100100 | 10.36.001.110 | 1 | 0 | 0 | 10 |

NEIGHBORING DEVICE INFORMATION STORED IN MFP04

| MFP NAME | MFP ID | MFP IP ADDRESS | REBOOT EXECUTION RANK | NO. OF NEIGHBORING MFPS | IP ADDRESS OF EACH NEIGHBORING MFP | ADJUSTMENT TIME |
|---|---|---|---|---|---|---|
| MFP04 | 400400 | 10.36.001.100 | 1 | 1 | 10.36.001.101 | 30 |

NEIGHBORING DEVICE INFORMATION STORED IN MFP05

| MFP NAME | MFP ID | MFP IP ADDRESS | REBOOT EXECUTION RANK | NO. OF NEIGHBORING MFPS | IP ADDRESS OF EACH NEIGHBORING MFP | ADJUSTMENT TIME |
|---|---|---|---|---|---|---|
| MFP05 | 500500 | 10.36.001.101 | 2 | 1 | 10.36.001.100 | 30 |

NEIGHBORING DEVICE INFORMATION STORED IN MFP92

| MFP NAME | MFP ID | MFP IP ADDRESS | REBOOT EXECUTION RANK | NO. OF NEIGHBORING MFPS | IP ADDRESS OF EACH NEIGHBORING MFP | ADJUSTMENT TIME |
|---|---|---|---|---|---|---|
| MFP92 | 900092 | 10.36.001.192 | 3 | 2 | 10.36.001.190<br>10.36.001.191 | 20 |

FIG. 13A

REBOOT (UPDATE START) TIME

<TIME SET BY SERVER>

| 5 | M | 5 | D | 2017 | Y | 03 | h | 00 | m |

<TIME SET MANUALLY>

REBOOT (UPDATE START) TIME

<TIME SET BY SERVER>

| 5 | M | 5 | D | 2017 | Y | 03 | h | 00 | m |

<TIME SET MANUALLY>

| M | D | Y | h | m |
| 5 | 5 | 2017 | 02 | 00 |

2017
2018
2019
2020
2021
2022

ENABLE MANUALLY SET TIME

REBOOT CONTROL SYSTEM

BACKGROUND

1. Field

The present disclosure relates to a reboot control system, and more particularly, to a reboot control system having a function of transmitting information demanding a reboot from a server to multiple information processing devices, such as multiple image forming devices installed in each of multiple stores, for example.

2. Description of the Related Art

In the related art, in an information processing device that executes a predetermined function on the basis of a program stored in advance, such as a PC or an image forming device, when it becomes desirable to add or update a function, or update a program such as by modifying or deleting a malfunctioning program, normally, after the new program is installed in the information processing device, the information processing device is rebooted, or an update process for the installed program is initiated.

Also, in convenience stores and the like, to keep image forming devices installed in each of multiple stores in good working order, a program installed in the image forming devices may be updated, or the image forming devices may be rebooted periodically or non-periodically even if the program is functioning correctly. In the case of rebooting multiple image forming devices or updating a program, for example, an instruction information about rebooting and the like is transmitted from a management device (server) that issues the instruction to multiple image forming devices all at once and at nearly the same time.

Also, a proposal has been made in which, in a large-scale system or the like that includes dozens of servers, the servers are divided into multiple server groups including a predetermined number of servers each, a reboot order is pre-planned for each server group, and normally the reboot order is followed such that the next server group is rebooted after waiting for all servers included in the first server group to finish rebooting. However, in a case in which the first server group determines that degenerate operation is possible, the next server group is rebooted even if there is a reboot error in the first server group, thereby reducing the load on the maintenance staff for the system and making it possible to execute the server reboot within a maintenance period (see Japanese Unexamined Patent Application Publication No. 2012-174220).

Furthermore, a proposal has been made in which, in an information processing device such as a printing device, in a case in which settings information such as an IP address of the device is changed and a reboot of the device becomes necessary, if a process of outputting a print job is being executed, for example, the device is made to stand by until the process ends, and by rebooting the device after the process ends, the device is rebooted efficiently (see Japanese Unexamined Patent Application Publication No. 2009-75635).

However, in the case of rebooting an information processing device or updating a program, depending on the device usage state or the scale of the program, the reboot or update may take dozens of minutes or more in some cases, and users are unable to use the information processing device while the device is rebooting and the like. Also, since the time it takes to reboot or update is different for each device and each program, accurately predicting the time at which the reboot or the like will end in advance is also difficult.

Particularly, in the case of transmitting instruction information about rebooting and the like to image forming devices installed in multiple stores such as convenience stores all at once and at nearly the same time, the process of rebooting and the like is executed at nearly the same time in the multiple stores that receive the instruction information. At this time, if a user attempts to use the image forming device at a certain store but is unable to because the image forming device is rebooting, the user has to wait until the reboot finishes without knowing when the image forming device will become usable again. In some cases, the user may have to wait for dozens of minutes or more, which inconveniences the user.

Additionally, in the case in which another store in the same convenience store chain provided with an image forming device is a few minutes away on foot, it is also possible for the user to walk to the other nearby store to utilize the image forming device in the other store.

However, in the case in which the process of rebooting the image forming devices in multiple stores is executed at nearly the same time, even if the user goes to another store, since the image forming device in the other store is also undergoing the reboot process, the user may be unable to use the other image forming device as well, and there is a problem in that the user may be greatly inconvenienced in such a situation.

Furthermore, with the technology described in Japanese Unexamined Patent Application Publication No. 2012-174220, regarding the multiple servers in the same server group, the installation locations of the servers are not taken into account, and in some cases the process of rebooting or the like may be executed at nearly the same time with respect to multiple nearby servers in the same server group, thereby making all of the multiple nearby servers unusable, and greatly inconveniencing users in some cases.

Consequently, in a case in which an image forming device installed in a store is unavailable for use by a user entering the store because the image forming device is undergoing a reboot process or the like, to not greatly inconvenience the user, if the user goes to a nearby store, it is desirable for the image forming device installed in the nearby store not to undergo a process of rebooting or updating a program, and remain in a usable state.

Accordingly, it is desirable to take circumstances like the above into account, and provide a reboot control system in which, for example, in information processing devices such as image forming devices in multiple nearby stores existing in a positional relationship such that a user is able to go from one store to another in a snort amount of time, a process such as rebooting or the like is not executed during the same time period, and during the time period, one or some of the information processing devices in the multiple nearby stores remain usable, thereby rebooting the multiple information processing devices without impairing convenience for the user.

SUMMARY

According to an aspect of the disclosure, there is provided a reboot control system including an information processing device and a reboot management device, connected to the information processing device over a network, that manages a reboot time of the information processing device. The reboot management device includes: a first storage unit that stores device management information including information related to one or a plurality of information processing devices being managed, and another information processing device determined to exist in a predetermined neighboring relationship with the information processing device; a reboot time setting unit that sets a reboot time at which to reboot the information processing device based on the device management information; and a reboot time notification unit that transmits the set reboot time to each information processing device. The information processing device includes: a reboot information acquisition unit that acquires a reboot time transmitted from the reboot management device; and a reboot execution unit that executes a reboot at the acquired reboot time. The reboot time setting unit takes into account a positional relationship of a plurality of information processing devices existing in the predetermined neighboring relationship to set the reboot times of the plurality of information processing devices existing in the predetermined neighboring relationship to mutually different times.

According to another aspect of the disclosure, there is provided an information processing device including: a reboot information acquisition unit that acquires a reboot time set by a reboot management device and a reboot time set in an other information processing device; a storage unit that stores reboot information including the reboot time set by the reboot management device and a scheduled reboot execution time, and neighboring device information including information that identifies the other information processing device existing in a predetermined neighboring relationship and an adjustment time for adjusting the reboot time; and a reboot execution unit that executes a reboot at the scheduled reboot execution time. In a case in which the reboot time acquired from the other information processing device existing in the predetermined neighboring relationship and the scheduled reboot execution time stored in the storage unit are approximately the same, based on the adjustment time, the scheduled reboot execution time stored in the storage unit is changed to a time separated from the reboot time acquired from the other information processing device by a predetermined amount of time or greater, or the other information processing device is requested to change the reboot time acquired from the other information processing device.

According to another aspect of the disclosure, there is provided an information processing device including: a reboot information acquisition unit that acquires a reboot time set by a reboot management device; a storage unit that stores reboot information including the reboot time set by the reboot management device and a scheduled reboot execution time, and neighboring device information including information that identifies an other information processing device existing in a predetermined neighboring relationship, an execution rank that indicates an order in which to execute rebooting in a case of consecutively rebooting a plurality of information processing devices existing in a neighboring relationship, and an adjustment time for adjusting the reboot time; and a reboot execution unit that executes a reboot at the scheduled reboot execution time. The reboot time set by the reboot management device stored in the storage unit is adjusted based on the execution rank and the adjustment time, such that if the execution rank is a highest rank, a same time as the reboot time set by the reboot management device is set as the scheduled reboot execution time, and as the execution rank becomes lower, a time later than the reboot time set by the reboot management device is set as the scheduled reboot execution time.

According to another aspect of the disclosure, there is provided an information processing device including: a reboot information acquisition unit that acquires a reboot time set by a reboot management device and a reboot time set in an other information processing device; a storage unit that stores reboot information including the reboot time set by the reboot management device and a scheduled reboot execution time, and neighboring device information including information that identifies an other information processing device existing in a predetermined neighboring relationship and an adjustment time for adjusting the reboot time; a reboot execution unit that executes a reboot at the scheduled reboot execution time; a usage state monitoring unit that monitors whether or not a predetermined implemented function is being executed, and in a case in which the predetermined function is being executed, determines that the information processing device is executing a function, or in a case in which the predetermined function is not being executed, determines that the information processing device is not executing a function; and a communication unit that communicates with the other information processing device. In a case in which the usage state monitoring unit determines that the information processing device is executing a function during a predetermined monitoring time period that includes the stored scheduled reboot execution time, the communication unit transmits change request information requesting a change to the scheduled reboot execution time to the other information processing device existing in the predetermined neighboring relationship. Then, in a case of receiving a change response indicating that the scheduled reboot execution time of the other information processing device is changeable from the other information processing device existing in the neighboring relationship, the stored scheduled reboot execution time and the scheduled reboot execution time of the other information processing device are exchanged, or in a case of receiving a change response indicating that the scheduled reboot execution time of the other information processing device is unchangeable from the other information processing device existing in the neighboring relationship, based on the adjustment time, the stored scheduled reboot execution time is changed to a time separated from the scheduled reboot execution time of the other information processing device by a predetermined amount of time or more.

According to another aspect of the disclosure, there is provided a reboot management device that manages a reboot time of one or a plurality of information processing devices, including: a storage unit that stores device management information including information related to one or a plurality of information processing devices being managed, and another information processing device determined to exist in a predetermined neighboring relationship with the information processing device; a reboot time setting unit that sets a reboot time at which to reboot the information processing device based on the device management information; and a reboot time notification unit that transmits the set reboot time to each information processing device. The reboot time setting unit takes into account a positional relationship of a plurality of information processing devices existing in the predetermined neighboring relationship to set the reboot times of the plurality of information processing devices existing in the predetermined neighboring relationship to mutually different times.

According to another aspect of the disclosure, there is provided a reboot control method of a reboot control system in which an information processing device and a reboot management device that manages a reboot time of the information processing device are connected over a network. The reboot control method includes: causing the reboot management device to store device management information including information related to one or a plurality of information processing devices being managed and another information processing device determined to exist in a predetermined neighboring relationship with the information processing device, and based on the stored device management information, set a reboot time at which to reboot the information processing device, and transmit the set reboot time to each information processing device; and causing the information processing device to acquire the reboot time transmitted from the reboot management device, and execute a reboot at the acquired reboot time. The setting of the reboot time takes into account a positional relationship of a plurality of information processing devices existing in the predetermined neighboring relationship to set the reboot times of the plurality of information processing devices existing in the predetermined neighboring relationship to mutually different times.

BRIEF DESCRIPTION OF THE DRAWINGS

FIG. 6 is an explanatory diagram illustrating one example of information stored in the reboot management device according to the present disclosure;

FIGS. 7A and 7B are explanatory diagrams illustrating one example of information stored in the reboot management device according to the present disclosure;

FIGS. 8A and 8B are explanatory diagrams illustrating one example of information stored in the reboot management device according to the present disclosure;

FIGS. 9A and 9B are explanatory diagrams illustrating one example of information stored in the reboot management device according to the present disclosure;

FIGS. 10A and 10B are explanatory diagrams illustrating one example of information stored in the image forming device according to the present disclosure;

FIG. 11 is an explanatory diagram illustrating one example of information stored in the image forming device according to the present disclosure;

FIGS. 13A and 13B are explanatory diagrams illustrating one example of a reboot time setting screen displayed on a display of the image forming device according to the present disclosure;

DESCRIPTION OF THE EMBODIMENTS

Hereinafter, an exemplary embodiment of the present disclosure will be described using the drawings. Note that the present disclosure is not limited by the following description of the examples.

Configuration of Reboot Control System

Figure 1:
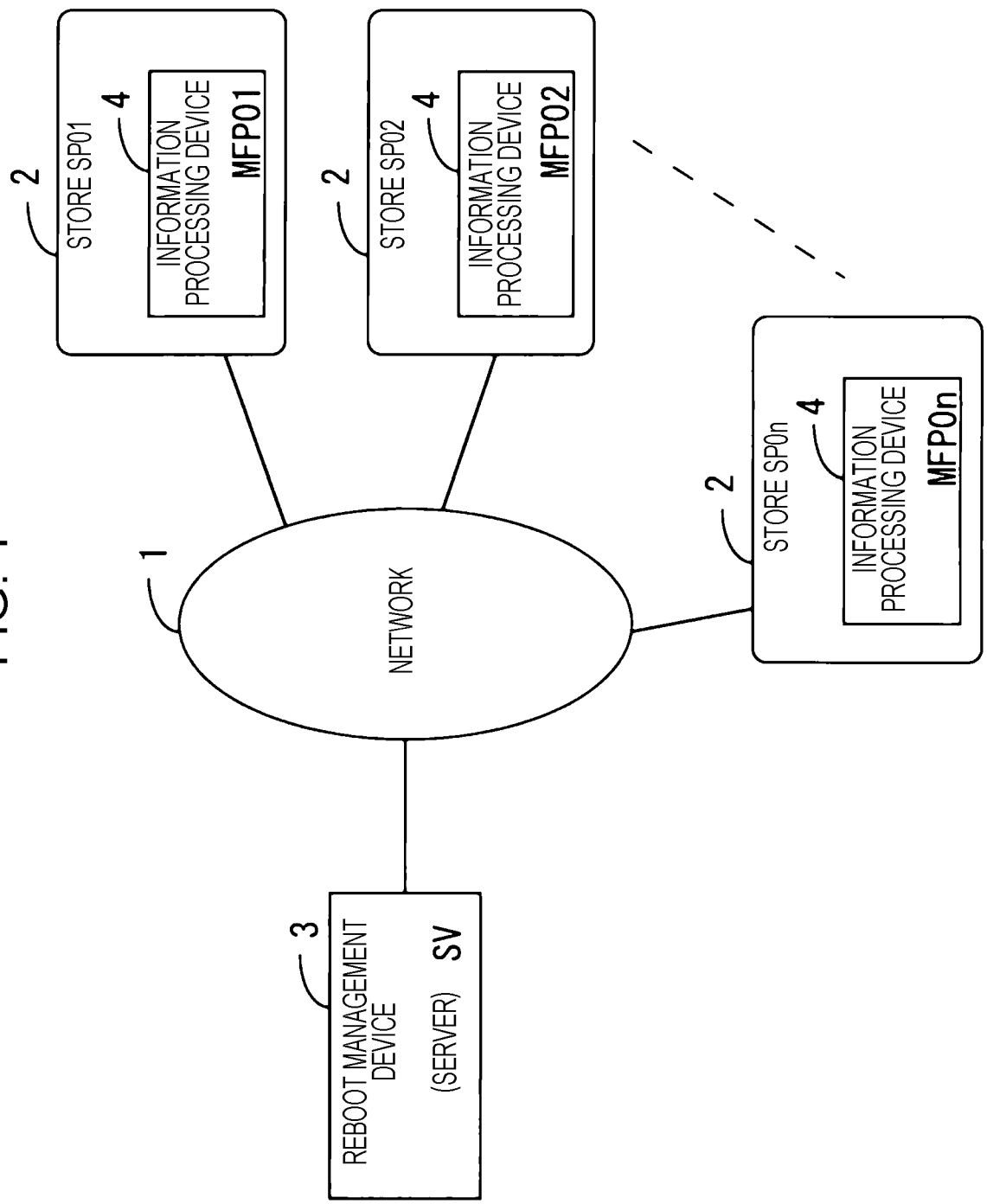
FIG. 1 is a diagrammatic configuration diagram illustrating one example of a reboot control system according to the present disclosure.

FIG. 1 is a diagrammatic configuration diagram illustrating one example of the reboot control system according to the present disclosure. The reboot control system according to the present disclosure generally is a system in which information processing devices 4 and a reboot management device 3 are connected over a network 1.

The reboot management device 3 is a device that manages the reboot times of the multiple information processing devices 4, such as by setting and storing a time at which to reboot each information processing device 4, transmitting the set reboot times to the information processing devices 4, and when appropriate, changing the set reboot times, for example. Hereinafter, the reboot management device 3 is also designated the server SV.

In addition, the reboot management device 3 (server SV) may also include a function of storing a program used by the information processing devices 4, and in the case of performing a program update such as adding, changing, or updating a program in the information processing devices 4, the reboot management device 3 (server SV) forwards the program to the targeted information processing devices 4. In this case, the server SV 3 sets and stores a time at which to start the program update in the information processing devices 4, and transmits the set update start time to the information processing devices 4.

In the present disclosure, the positional relationship of multiple information processing devices existing in a predetermined neighboring relationship is taken into account to set the reboot time or the update start time for each of the multiple information processing devices existing in the predetermined neighboring relationship to mutually different times.

Particularly, with regard to two or three or more information processing devices 4 existing in a positional relationship such that a user is able to go from one device to another in a relatively short predetermined time, the reboot time or the update start time for each information processing device is set and changed to mutually different times.

In the following example, for the reboot time and the update start time, it is assumed that a date and time including the year, month, day, hour, and minute (designated the reboot time or the update start time) is set. Also, although the following example generally describes setting and changing the reboot time, description regarding the reboot time may also apply to the update start time where appropriate.

The information processing device 4 is a computer, such as a personal computer, that executes predetermined functions. In particular, in the present disclosure, the information processing device 4 automatically reboots itself or starts an update of a program used by the information processing device 4, on the basis of the reboot start time or the update start time transmitted from the server SV.

Also, the following example assumes that multiple information processing devices 4 are installed respectively in stores such as convenience stores or supermarkets, or public facilities such as city halls or libraries, and are connected to the server SV over the network 1.

In FIG. 1, multiple information processing devices 4 (MFP01 to MFP0n) are installed respectively in each store (SP01 to SP0n), and it is assumed that predetermined data communication over the network 1 is possible between each information processing device 4 and the server SV 3, or between the information processing devices 4 with each other.

The information processing devices 4 installed in the stores are devices having a variety of functions, such as image forming devices (hereinafter also called multi-function peripherals (MFPs)), kiosk terminals, or ATMs, for example. In the following example, a case of utilizing image forming devices as the information processing devices 4 will be described. However, the information processing devices 4 are not limited to image forming devices. An image forming device (multi-function peripheral, MFP) is a piece of electronic equipment having any one or more functions from among a function of inputting image information (document reading function), a function of printing image information (print function), and a function of forwarding image information to another information processing device or storage medium (communication function), for example.

For the network 1, it is sufficient to use any existing network, such as the Internet, the telephone network, a wide area network such as a mobile communication network, or a LAN used only inside predetermined premises, for example. The communication method may use any of wired communication and wireless communication.

Figure 2:
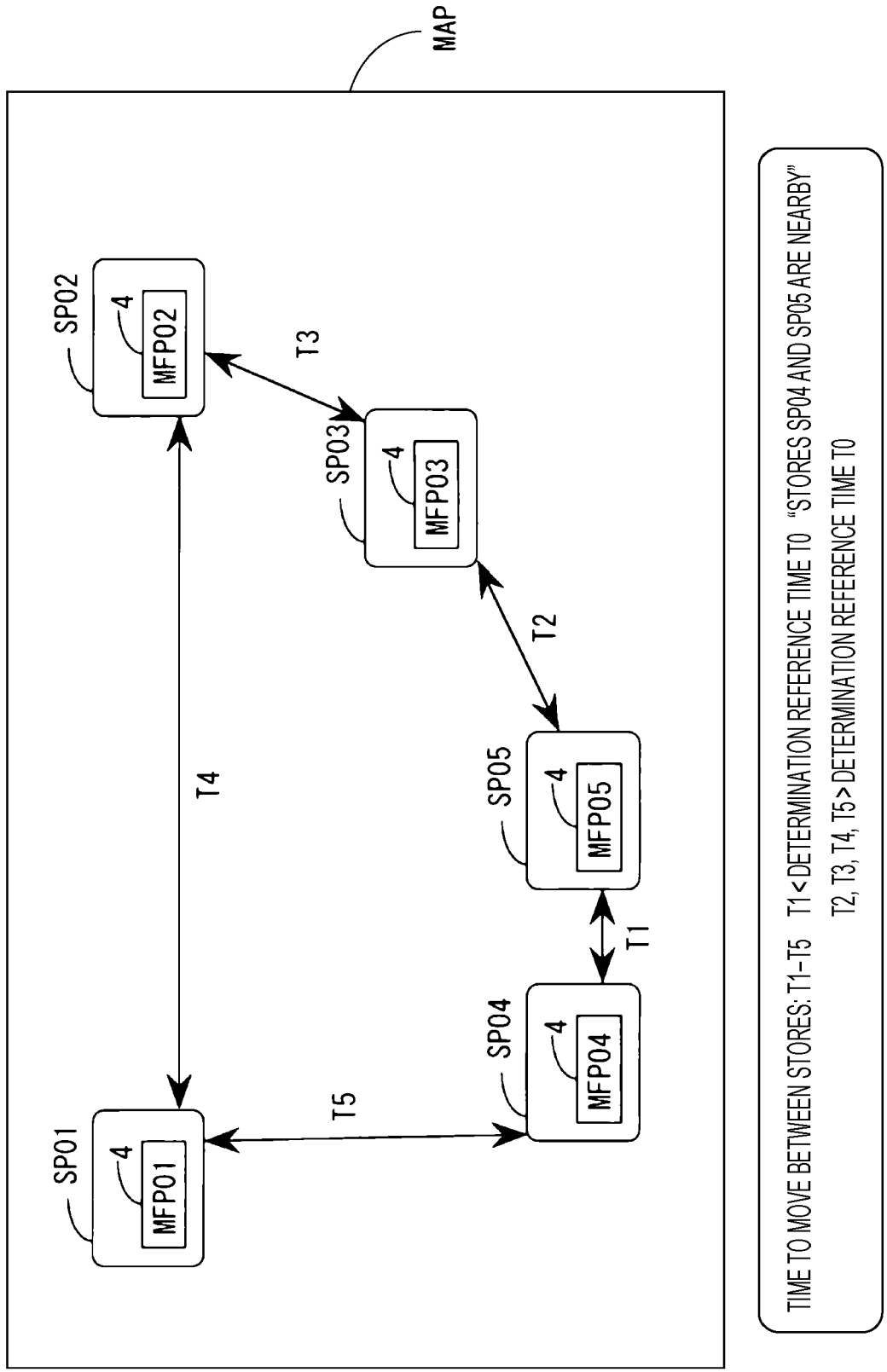
FIG. 2 is an explanatory diagram illustrating one example of the positional relationship of information processing devices installed in each store according to the present disclosure.

FIG. 2 is an explanatory diagram illustrating one example of the positional relationship of information processing devices (MFPs) installed in each store according to the present disclosure. FIG. 2 illustrates a diagram of a map that includes five stores (SP01 to SP05). Also, it is assumed that a single multi-function peripheral (MFP01 to MFP05) 4 is installed in each shop.

Furthermore, FIG. 2 illustrates one example of average travel times (T1 to T5) taken by a user using the stores to go to each store. For example, the average travel time taken to travel between the store SP01 and the store SP02 is illustrated as the time T4. Also, the average travel time taken to travel between the store SP04 and the store SP05 is illustrated as the time T1. The average travel time between stores may be measured by actually pacing, and it is sufficient for an administrator of the server SV to set and store in advance the actually paced times in the server SV.

In the present disclosure, two or more stores existing in any positional relationship like the following are assumed to be in a neighboring relationship with each other.

(1) In the case in which the travel time between any two stores where information processing devices are installed is shorter than a predetermined determination reference time, the two stores are determined to be in a neighboring relationship.

(2) In the case in which the direct distance between any two stores where information processing devices are installed is shorter than a predetermined determination reference distance, the two stores are determined to be in a neighboring relationship. Also, a single information processing device is installed in each store, and in the case in which two stores are in a neighboring relationship, the information processing devices installed in the two stores are also determined to be in a neighboring relationship.

First, in the case of (1), as illustrated in FIG. 2, in the case in which the travel time T (T1 to T5) between two stores is shorter than a preset determination reference time T0, the two stores are taken to neighbor each other. For the determination reference time T0, a time from approximately 3 to 5 minutes is preset, for example. In FIG. 2, for example, among the travel times (T1 to T5) between the stores, in the case in which the travel time T1 between the store SP04 and the store SP05 is shorter than the determination reference time T0 (T1<T0), the store SP04 and the store SP05 are taken to neighbor each other. As described later, difference reboot times are set in information processing devices installed in stores that exist in a neighboring relationship.

On the other hand, in the case in which the travel times (T2 to T5) between the stores are equal to or greater than the determination reference time T0 (T2, T3, T4, T5≥T0), the two stores corresponding to these travel times are taken not to neighbor each other. For example, in the case in which the travel time T3 between the store SP02 and the store SP03 is equal to or greater than the determination reference time T0 (T3≥T0), the store SP02 and the store SP03 are taken not to neighbor each other.

In the following example, as a general rule, it is assumed that the store SP04 and the store SP05 neighbor each other, but the other stores do not neighbor each other. The determination reference time T0 may be set in a fixed manner and stored in advance, or the administrator of the server SV may be able to change the setting.

Also, as in (2), the direct distance between stores may be used instead of the travel time between stores as the basis for determining whether or not two stores are in a neighboring relationship. For example, the direct distance L between two stores may be calculated from the positional coordinates of the stores measured by GPS, and in the case in which the direct distance L between the stores is shorter than a predetermined determination reference distance L0, the two stores may be determined to neighbor each other.

Alternatively, instead of the direct distance L between stores, an actual walking route between stores may be detected from the positional coordinates of the stores and map street information, a travel distance that takes the walking route into account or an average travel time taken to walk the walking route may be calculated, and the travel distance or the travel time may be treated as a basis for determining whether or not the two stores are in a neighboring relationship.

In the server SV, the travel time T between each of the stores or the direct distance L between each of the stores is input in advance for the multiple stores, and as described later, such input is stored in the server SV as multi-function peripheral positional relationship information, and the travel time T or the direct distance L is utilized to decide whether or not the positional relationship between stores is a neighboring relationship.

Configuration of Image Forming Device

Figure 3:
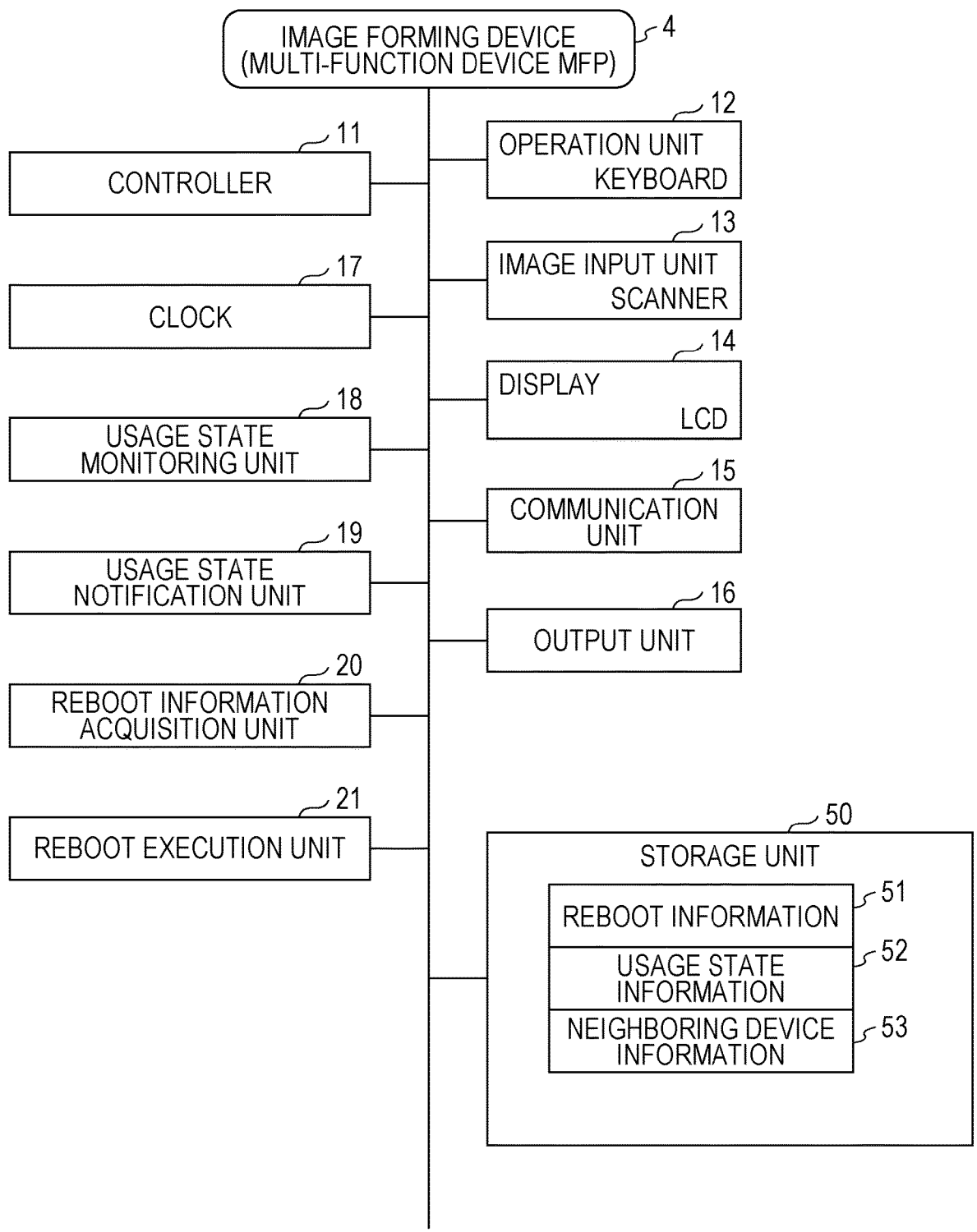
FIG. 3 is a configuration block diagram illustrating one example of an image forming device according to the present disclosure.

FIG. 3 is a configuration block diagram illustrating one example of an image forming device corresponding to the information processing device according to the present disclosure. The image forming device 4 (multi-function peripheral (MFP)) is a device that processes image data, and is for example a piece of electronic equipment provided with a document reading function (scan function), a print function, a communication function, a copy function, a fax function, and the like.

In FIG. 3, the image forming device (MFP) 4 according to the disclosure generally is provided with a controller 11, an operation unit 12, an image input unit 13, a display 14, a communication unit 15, an output unit 16, a clock 17, a usage state monitoring unit 16, a usage state notification unit 19, a reboot information acquisition unit 20, a reboot execution unit 21, and a storage unit 50.

The controller 11 is a part that controls the operation of each component such as an image input unit, and is realized by a microcontroller that generally includes a CPU, ROM, RAM, an I/O controller, a timer, and the like. The CPU causes various hardware to operate effectively on the basis of a control program pre-stored in the ROM or the like, and execute functions such as the image input function and the reboot function according to the present disclosure.

The operation unit 12 is a part by which information such as text is input and functions are selected. A keyboard, a mouse, a touch panel, and the like are used as the operation unit 12. In the present disclosure, a manager of a store where an image forming device is installed uses the operation unit 12 to set the reboot time of the image forming device and the update start time of a program update. The set reboot time is stored in the storage unit 50 as a scheduled reboot execution time.

The image input unit 13 is a part that inputs image information, and for example, inputs information such as a document on which an image, text, graphics, or the like is recorded. The input information is stored in the storage unit 50 as electronic data. A scanner (reading device) that scans a document with information printed thereon is used as the image input unit 13.

However, the method of input information such as an image is not limited to the above, and for example, an electronic data file of an image or document to be input may be saved to an external storage medium such as USE memory, the USB memory or the like may be connected to an input interface such as a USE port, and by performing a predetermined input operation on the operation unit 12, the desired electronic data file saved to the USB memory or the like may be read out and stored in the storage unit 50 as electronic data.

The display 14 is a part that displays information, and displays information relevant to the execution of each function, the results of executing functions, and the like to inform the user. For example, an LCD, an OLED display, or the like may be used, and in the case in which a touch panel is used as the operation unit 12, the display and the touch panel may be disposed overlaid onto each other. In the present disclosure, for example, as described later, in the case in which the user set a reboot time in an MFP, the display 14 displays the manual set time set by the user.

The communication unit 15 is a part that communicates data with the server SV and the other multi-function peripherals (MFPs). For example, information such as a reboot time transmitted from the server SV is received. Also, usage state information about toe multi-function peripheral (MFP) itself and a changed reboot time is transmitted to the server SV. Furthermore, queries about the reboot time and requests to change the reboot time are transmitted to the other multi-function peripherals (MFPs).

The output unit 16 is a part that outputs generated image information, and for example, corresponds to a printer that prints and outputs image information onto paper media. However, the outputting of information is not limited to printing, and may also be the storage of information in an external storage medium such as USB memory, or the transmission of information to another information processing device or a server over a network such as the Internet.

The clock 17 is a part that acquires the current time. For example, the year, month, day, hour, and minute are acquired in response to a request from the CPU.

The usage state monitoring unit 18 is a part that monitors the current usage state of the MFP. In particular, the usage state monitoring unit 18 monitors whether or not a predetermined function implemented in the MFP is being executed. Also, in the case in which the predetermined function is being executed, the MFP is determined to be executing a function, whereas in the case in which the predetermined function is not being executed, the MFP is determined not to be executing a function. For example, in the case in which a predetermined function such as the print function or the image input function is being executed according to an instruction from a user who is using the MFP, the MFP is determined to be in a used state (executing a function). Also, in the case in which none of the predetermined functions are being executed, the MFP is determined to be in an unused state (not executing a function). The determination result of whether the MFP is executing a function or not executing a function is stored in the storage unit 50 as usage state information.

The monitoring of the current usage state of an MFP may be executed continuously, or for example, may be executed when there is a usage state query from the server SV or another MFP. Also assume that in the case in which the reboot time approaches, the monitoring of the current usage state of an MFP is executed during a predetermined monitoring time period. The monitoring time period is a period set on the basis of the reboot time at which a reboot is scheduled to be executed. A period that includes the scheduled reboot execution time stored in advance and extends from several minutes before the scheduled reboot execution time until several minutes after is set as the monitoring time period. For example, assume that in the case in which 10 minutes before and 10 minutes after the reboot time are preset as the monitoring time period, the usage state is monitored from 10 minutes before the set reboot time until 10 minutes after the reboot time.

Also, in the case of determining that a function is being executed and a predetermined function of the MFP is being used by a user, assume that to continue with the usage state, the reboot process is not executed even if the current time matches the reboot time.

The usage state notification unit 19 is a part that notifies the server SV or other MFPs about the current usage state of an MFP. In other words, current usage state information determined by the usage state monitoring unit 18 is transmitted to the server SV and other MFPs. For example, in the case in which there is a usage state query from the server SV, the usage state monitoring unit 18 determines the current usage state of the MFP, and the usage state notification unit 19 transmits the determination result (whether a function is being executed or a function is not being executed) to the server SV. Also, in the case in which the preset reboot time approaches, if the usage state is that a function is being executed, there is a possibility that the state of executing a function will continue and the reboot process will not be executed even when the reboot time arrives. Therefore, information indicating that a reboot is unavailable may be transmitted to the server SV together with, or instead of, information indicating that a function is being executed.

The reboot information acquisition unit 20 is a part that acquires reboot-related information from the server SV and other MFPs. For example, a reboot time set by the server SV and transmitted from the server SV or a reboot time (reboot date and time) set in another MFP is acquired. The acquired reboot-related information is stored in the storage unit 50 as reboot information. Also, as described above, a monitoring time period is set on the basis of the acquired reboot time. The periods before and after the reboot time that specify the reboot time period may be set in a fixed manner, such as 10 minutes for example, but are not limited thereto, and the user may also be able to change the setting for the periods before and after the reboot time.

The reboot execution unit 21 is a part that executes an MFP reboot, and as a general rule, executes the reboot at the acquired reboot time. Also, the reboot execution unit 21 starts the reboot of the MFP itself at the reboot time stored in the storage unit 50 as the scheduled reboot execution time. However, as described above, in the case in which a user is using a predetermined function of the MFP, the reboot is not executed even when the scheduled reboot execution time arrives.

The storage unit 50 is a part that stores relevant information and programs for executing each function of an MFP according to the present disclosure, and is semiconductor memory such as ROM, RAM, or flash memory, a storage device such as an HDD or an SSD, or some other storage medium. The storage unit 50 corresponds to the second storage unit described earlier.

The storage unit 50 stores, for example, reboot information 51, usage state information 52, neighboring device information 53, and the like. FIGS. 10A and 10B, FIG. 11, and FIGS. 12A and 12B illustrate one example of the information stored in the storage unit 50 of an MFP.

The reboot information 51 is information related to the reboot of MFPs. FIG. 10A illustrates one example of the reboot information 51. Herein, one example of the reboot information 51 stored in four MFPs is illustrated. For example, the reboot information 51 includes an MFP name, an MFP ID, a received reboot time, and a scheduled reboot execution time. The MFP name and MFP ID are information that identifies the MFP. As the information that identifies the MFP, the IP address of the MFP may be used. However, in the case in which an MFP only stores reboot information regarding itself, the MFP name and MFP ID do not have to be stored.

The received reboot time is set by the server SV, and is the reboot time (reboot date and time) transmitted from the server SV. In FIG. 10A, the same time is stored for all four MFPs as the received reboot time. The scheduled reboot execution time means the time at which a reboot actually starts. In FIG. 10A, as the scheduled reboot execution time, MFP01 and MFP02 store the same time as the received reboot time, but MFP04 and MFP05 existing in a neighboring relationship store adjusted times.

However, in the case in which only the server SV manages the setting and changing of reboot times and the like, and a reboot is executed at the received reboot time, the scheduled reboot execution time does not have to be stored. In the case of treating the received reboot time as a base of reference by which to set or adjust the reboot time depending on a neighboring MFP, it is sufficient to store the scheduled reboot execution time.

The usage state information 52 stores the current usage state of an MFP determined by the usage state monitoring unit 18. FIG. 10B illustrates one example of the usage state information 52. For example, the usage state information 52 includes an MFP name, an MFP ID, and information indicating a usage state. However, in the case in which an MFP only stores a usage state regarding itself, the MFP name and MFP ID do not have to be stored.

The information indicating the usage state includes information indicating that a function is not being executed and information indicating that a function is being executed. In FIG. 10B, 0 is stored as information meaning that a function is not being executed, while 1 is stored as information meaning that a function is being executed. In FIG. 10B, for example, in MFP01 for which the information indicating the usage state is 0, the current usage state means that a function is not being executed. Also, in MFP04 for which the information indicating the usage state is 1, the current usage state means that a function is being executed.

The neighboring device information 53 stores in advance information about another MFP existing a predetermined neighboring relationship with the MFP itself. In particular, the neighboring device information 53 includes information that identifies the other MFP in the neighboring relationship, an execution ranking that indicates the order in which to execute the reboot in the case of successively rebooting multiple MFPs in a neighboring relationship, and an adjustment time for adjusting the reboot time. The neighboring device information 53 may be input into each MFP, but preferably is input into the server SV and transmitted from the server SV to each MFP.

FIG. 11 illustrates one example of the neighboring device information 53. For example, the neighboring device information 53 includes an MFP name, an MFP ID, an MFP IP address, a reboot execution rank, a number of neighboring MFPs, an IP address of each neighboring MFP, and an adjustment time. However, in the case in which an MFP only stores neighboring device information regarding itself, the MFP name and MFP ID do not have to be stored.

The IP address or the MFP is an individual identification number assigned to the MFP itself to identify MFPs connected to a network. The reboot execution rank means the reboot priority rank set for the MFP itself in the case in which there are multiple MFPs in a neighboring relationship. In the case in which there are multiple MFPs in a neighboring relationship, the MFPs in the neighboring relationship are not rebooted at the same time, but instead, as a general rule, the multiple MFPs in the neighboring relationship are booted in order according to the set reboot execution ranking, offset by a predetermined time. For an MFP not in a neighboring relationship with any other MFP, the reboot execution rank is fixed at 1.

The number of neighboring MFPs means the number of MFPs in a neighboring relationship. For example, the case in which the number of neighboring MFPs is 1 means that there is one MFP existing in a neighboring relationship with the MFP itself. The case in which the number of neighboring MFPs is 0 means that there is no MFP existing in a neighboring relationship with the MFP itself.

The IP address of each neighboring MFP stores the IP address of each MFP existing in a neighboring relationship with the MFP itself. For example, in the case in which the number of neighboring MFPs is 1, the IP address of the one MFP in the neighboring relationship is stored, whereas in the case in which the number of neighboring MFPs is 2, the IP addresses of the two MFPs in the neighboring relationship are stored. In the case in which the number of neighboring MFPs is 0, the IP address of each neighboring MFP is not valid, and it is sufficient to store 0, for example.

The adjustment time is a preset time for adjusting the time at which to execute a reboot (scheduled execution time) between MFPs existing in a neighboring relationship, and corresponds to an offset time of the reboot time. For example, if 30 is set as the adjustment time, this means that another MFP in the neighboring relationship will execute a reboot after an interval of 30 minutes as a general rule.

FIG. 11 illustrates an example of the neighboring device information 53 stored in four MFPs. In MFP01, the number of neighboring MFPs is 0, meaning that there is no MFP existing in a neighboring relationship with MFP01 itself. In MFP04 and MTP05, the number of neighboring MFPs is 1, meaning that one other MFP exists in a neighboring relationship with the MFP itself, the MFPs are in a neighboring relationship with each other, and the IP address of the other MFP is stored as the IP address of the neighboring MFP. Also, in MFP04 and MFP05 in a neighboring relationship, since the reboot execution rank of MFP04 is set to 1 while the reboot execution rank of MFP05 is set to 2, MFP04 has a higher reboot priority, and thus MFP04 will be rebooted first as a general rule. Furthermore, since the adjustment time is 30, as a general rule, the reboot of MTP05 will be started after 30 minutes elapses from the start of the reboot of MFP04.

In the neighboring device information 53 stored in MFP92, the number of neighboring MFPs is 2, meaning that two MFPs exist in a neighboring relationship with the MFP itself, and the IP addresses of the two neighboring MFPs are stored as the IP address of each neighboring MFP. Also, the reboot execution rank of MFP92 is 3, meaning that the reboot priority is the lowest among the three MFPs existing in a neighboring relationship.

Figure 12A:
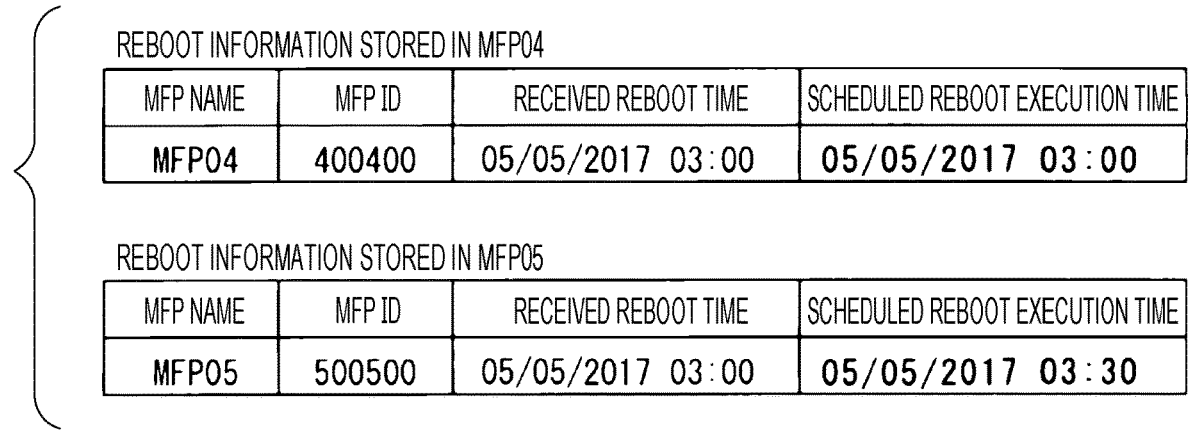
FIGS. 12A and 12B are explanatory diagrams illustrating one example of information stored in the image forming device according to the present disclosure.
Figure 12B:
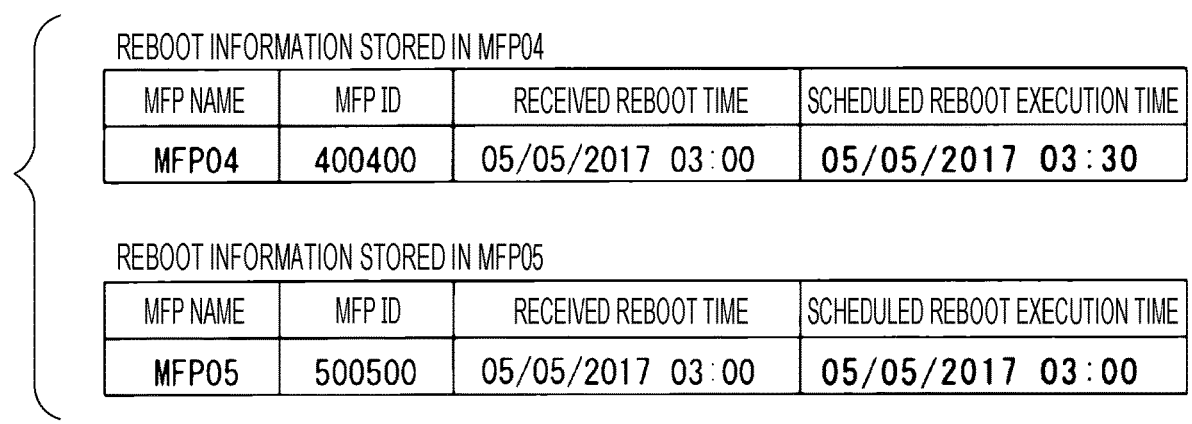

FIGS. 12A and 12B illustrate one example of the reboot information 51 after adjusting the reboot times. As described above, the execution rank and the adjustment time of the neighboring device information 53 are utilized to adjust the reboot times of MFPs existing in a neighboring relationship. At the least, the time taken by a user to travel to another neighboring MFP is taken into account to change the time at which to reboot another MFP in the neighboring relationship, or the time at which to reboot the MFP itself. In other words, in the case in which the reboot time acquired from another MFP in a predetermined neighboring relationship is close to the scheduled reboot execution time stored in the storage unit 50, on the basis of the adjustment time, the scheduled reboot execution time stored in the storage unit 50 is changed to a time separated from the reboot time acquired from the other MFP by a predetermined amount of time or more, or alternatively, a request to change the reboot time acquired from the other MFP is issued to the other MFP.

FIG. 12A illustrates reboot information after adjusting the reboot times according to the execution ranking of the neighboring MFPs for the two devices MFP04 and MFP05 in a neighboring relationship. In FIG. 12A, since the received reboot times of MFP04 and MFP05 in the neighboring relationship are the same time (05/05/2017 03:00), the reboot time are adjusted.

Assuming that the neighboring device information 53 of MFP04 and MFP05 is that illustrated in FIG. 11, the reboot execution rank of MFP04 is 1 while the reboot execution rank of MFP05 is 2, and therefore the reboot time of MFP05 is delayed. Also, since the adjustment time is 30 in the neighboring device information 53 of MFP04 and MFP05, the reboot time of MFP05 is delayed 30 minutes. In other words, the scheduled reboot execution time of MFP04 is the same time as the received reboot time, but the scheduled reboot execution time of MFP05 is changed to a time (05/05/2017 03:30) 30 minutes later than the scheduled reboot execution time of MFP04. A detailed process of adjusting reboot times will be described later.

FIG. 12B illustrates reboot information after adjusting the reboot times for the two devices MFP04 and MFP05 in a neighboring relationship by exchanging the scheduled reboot execution time of MFP04 and the scheduled reboot execution time of the neighboring MFP05 in the case in which MFP04 is unable to reboot. The case in which MFP04 is unable to reboot means, for example, the case in which 05/05/2017 03:00 is set as the scheduled reboot execution time of MFP04, and the current time is 10 minutes before the scheduled reboot execution time, but the usage state of MFP04 is that a function is being executed.

At this point, even if the current time becomes the scheduled reboot execution time 05/05/2017 03:00 for MFP04, since there is a possibility that the usage state of MFP04 will still be that a function is being executed, predetermined data is communicated between MFP04 and MFP05, and the scheduled reboot execution times are exchanged In other words, the scheduled reboot execution time of MFP04 is set to a time (05/05/2017 03:30) 30 minutes after MFP05, while the scheduled reboot execution time of MFP05 is set to a time (05/05/2017 03:00) 30 minutes before MFP04. A detailed process of adjusting reboot times will be described later.

Configuration of Reboot Management Device (Server SV)

Figure 4:
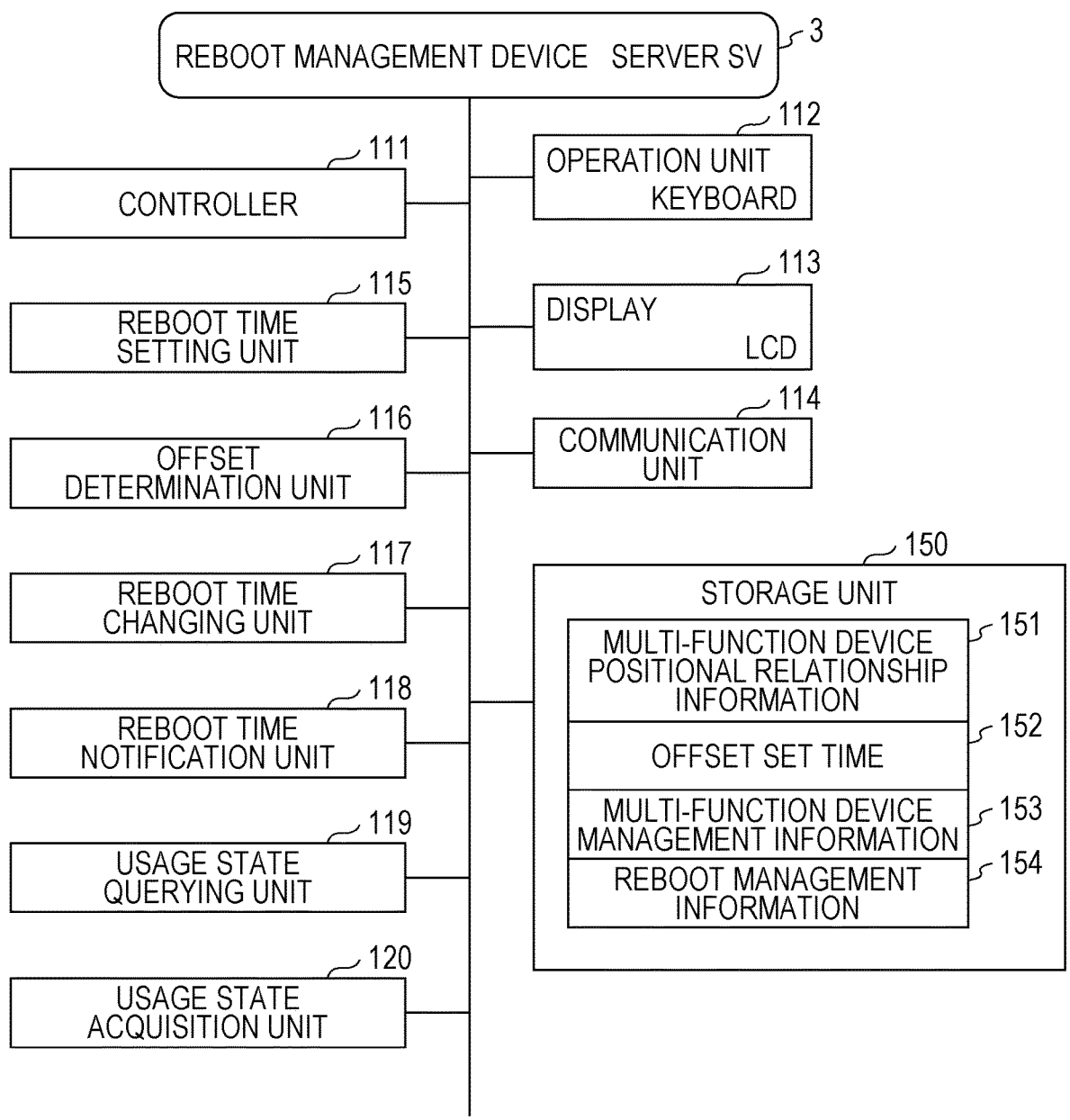
FIG. 4 is a configuration block diagram illustrating one example of a reboot management device according to the present disclosure.

FIG. 4 is a configuration block diagram illustrating one example of the reboot management device (server SV) according to the present disclosure. The reboot management device (server SV) generally is a device that manages the reboot times of one or multiple MFPs. Particularly, the server SV stores information about MFPs existing in a neighboring relationship, and takes the positional relationship of multiple MFPs in a predetermined neighboring relationship into account to set the reboot times of the multiple MFPs in the predetermined neighboring relationship to mutually different times.

In FIG. 4, the reboot management device (server SV) 3 according to the present disclosure generally is provided with a controller 111, an operation unit 112, a display 113, a communication unit 114, a reboot time setting unit 115, an offset determination unit 116, a reboot time changing unit 117, a reboot time notification unit 118, a usage state querying unit 119, a usage state acquisition unit 120, and a storage unit 150.

The controller 111 is a part that controls the operation of each component such as a reboot time setting unit, and is realized by a microcontroller that generally includes a CPU, ROM, RAM, an I/O controller, a timer, and the like. The CPU causes various hardware to operate effectively on the basis of a control program pre-stored in the ROM or the like, and execute functions such as the reboot time setting function and the reboot time notification function according to the present disclosure.

The operation unit 112 is a part by which information such as text is input and functions are selected. A keyboard, a mouse, a touch panel, and the like are used as the operation unit 112. In particularly, in the present disclosure, the operation unit 112 is used to input MFP positional relationship information, offset times, MFP management information, and the like in advance.

The display 113 is a part that displays information, and displays information relevant to the execution of each function, the results of executing functions, and the like to inform a server administrator. For example, an LCD, an OLED display, or the like may be used, and in the case in which a touch panel is used as the operation unit 112, the display and the touch panel may be disposed overlaid onto each other. In the present disclosure, for example, MFP management information set by the server administrator, current reboot management information, and the like is displayed by the display 113.

The communication unit 114 is a part that communicates data with an MFP. For example, information such as the reboot time and a usage state query is transmitted from the server SV to an MFP. Also, usage state information and a changed reboot time are received from an MFP.

The reboot time setting unit 115 is a part that sets the reboot time at which to reboot one or multiple MFPs being managed by the server SV, on the basis of MFP management information stored in the storage unit 150 described later. The MFP management information corresponds to the device management information described earlier. Also, with regard to the reboot times of multiple information processing devices existing in a predetermined neighboring relationship, the reboot time setting unit 115 sets reboot times offset from each other by an offset set time stored in advance in the storage unit 150 described later.

To keep an MFP in good operating condition, the MFP is rebooted periodically or non-periodically. Also, to address a malfunction, add a new function, or the like with respect to a program installed in an MFP, an update of the program is performed periodically or non-periodically in some cases. Performing a program update also involves rebooting the MFP in some cases.

The times at which to reboot MFPs and the times at which to update programs are centrally managed by the server SV. For example, for MFPs installed in convenience stores that are open for 24 hours, the time at which to reboot and the like is set during a time period of minimal usage frequency, such as in the middle of the night, for example. Also, in the case of rebooting or updating programs in multiple MFPs, to make MFP management more certain and simple, it is desirable for processes such as rebooting to end at nearly the same time in all MFPs. Accordingly, in the case of setting a time at which to reboot the MFPs or the like, initially, the same time is set as the time at which to reboot or the like for all MFPs under management.

Also, in the case of setting a time at which to reboot periodically, it is sufficient to store the time at which to reboot as a fixed value in advance. Alternatively, in the case of setting a time at which to reboot non-periodically, or in the case of setting a time at which to update a program, it is sufficient for the server administrator to use the operation unit 112 to input and store the time in the storage unit 150 as a temporary set time. In the case of setting a reboot time, for example, as illustrated in FIG. 7B described later, a reboot time of reboot management information 154 is set and stored.

The offset determination unit 116 is a part that determines whether or not to offset the initially set reboot time of an MFP. In the present disclosure, to avoid a state in which a user travels to the location of another MFP but the other MFP is unusable, and to avoid inconveniencing the user, the reboot times of MFPs existing in a neighboring relationship are set to different times. Accordingly, for an MFP having a preset MFP in a neighboring relationship (neighboring MFP), it is determined to offset the reboot time.

Specifically, MFP management information described later in which information related to neighboring MFPs is stored in advance is checked, and it is determined to offset the reboot time of the MFP having the preset neighboring MFP or the neighboring MFP. For an MFP whose reboot time is determined to be offset, the reboot time is changed by the reboot time changing unit 117 described later.

The reboot time changing unit 117 is a part that changes the reboot time of an MFP. In particular, the offset determination unit 116 changes the reboot time of the MFP whose reboot time is determined to be offset. In the present disclosure, for multiple MFPs existing a neighboring relationship, the reboot time of one or multiple MFPs among the MFPs existing in the neighboring relationship is changed such that the reboot times are different. For example, an offset set time stored in advance in the storage unit 150 is utilized to change the reboot time in the reboot management information 154 for the targeted MFP or MFPs. As a specific example, in the case in which there are two MFPs existing in a neighboring relationship, and 30 minutes is preset as the offset set time, the reboot time of one of the MFPs in the neighboring relationship is delayed 30 minutes.

The reboot time notification unit 118 is a part that transmits the reboot time set by the reboot time setting unit 115 to each MFP. The reboot time set for each MFP by the server SV or the reboot time changed by the reboot time changing unit 117 is transmitted to each MFP. In an MFP receiving the reboot time, the received reboot time is stored, and as a general rule, when the current time matches the reboot time, a reboot is initiated. However, in the case in which there is a possibility of the MFP being in a used state and being unable to reboot before or after the reboot time, the reboot time is adjusted in some cases.

The usage state querying unit 119 is a part that transmits a query requesting confirmation of the current usage state to an MFP. Generally, in the case in which there exists an MFP whose current usage state is that a function is being executed, a usage state query is transmitted to a neighboring MFP existing in a neighboring relationship with the MFP in which a function is being executed. This query is issued to confirm whether or not the reboot times may be exchanged between the MFP in which a function is being executed and the neighboring MFP. In an MFP receiving the usage state query, as described earlier, the usage state monitoring unit 18 monitors the usage state of the MFP itself, and transmits a response regarding the usage state to the server SV.

The usage state acquisition unit 120 is a part that receives usage state information or a response regarding the usage state transmitted from an MFP, and acquires the current usage state of the MFP. The acquired usage state information indicates that a function is not being executed, or that a function is being executed. Depending on the acquired usage state information, the reboot time of an MFP existing in a neighboring relationship is changed (re-set).

For example, in the case in which the usage state acquisition unit 120 acquires usage state information indicating that a function is being executed from a first MFP, the reboot time of the first MFP that transmitted the usage state information indicating that a function is being executed is changed, or alternatively, if there is another, second MFP existing in a neighboring relationship with the first MFP, the reboot times of the first MFP and the second MFP are exchanged with each other.

The storage unit 150 is a part that stores relevant information and programs for executing each function of the server SV according to the present disclosure, and is semiconductor memory such as ROM, RAM, or flash memory, a storage device such as an HDD or an SSD, or some other storage medium. The storage unit 150 corresponds to the first storage unit described earlier. The storage unit 150 stores, for example, MFP positional relationship information 151, offset set time 152, MFP management information 153, reboot management information 154, and the like. FIGS. 5 to 9B are explanatory diagrams illustrating one example of information stored in the reboot management device according to the present disclosure.

The MFP positional relationship information 151 is information storing the positional relationships of managed MFPs in advance. For example, the travel time and the direct distance between two stores where MFPs are installed is stored. However, it is also possible to store either one of the travel time and the direct distance. Also, instead of the direct distance, an actual travel distance that takes a walking route between the two MFPs into account may also be stored. The MFP positional relationship information 151 is used to decide whether or not the stores where two MFPs are installed neighbor each other.

Figure 5:
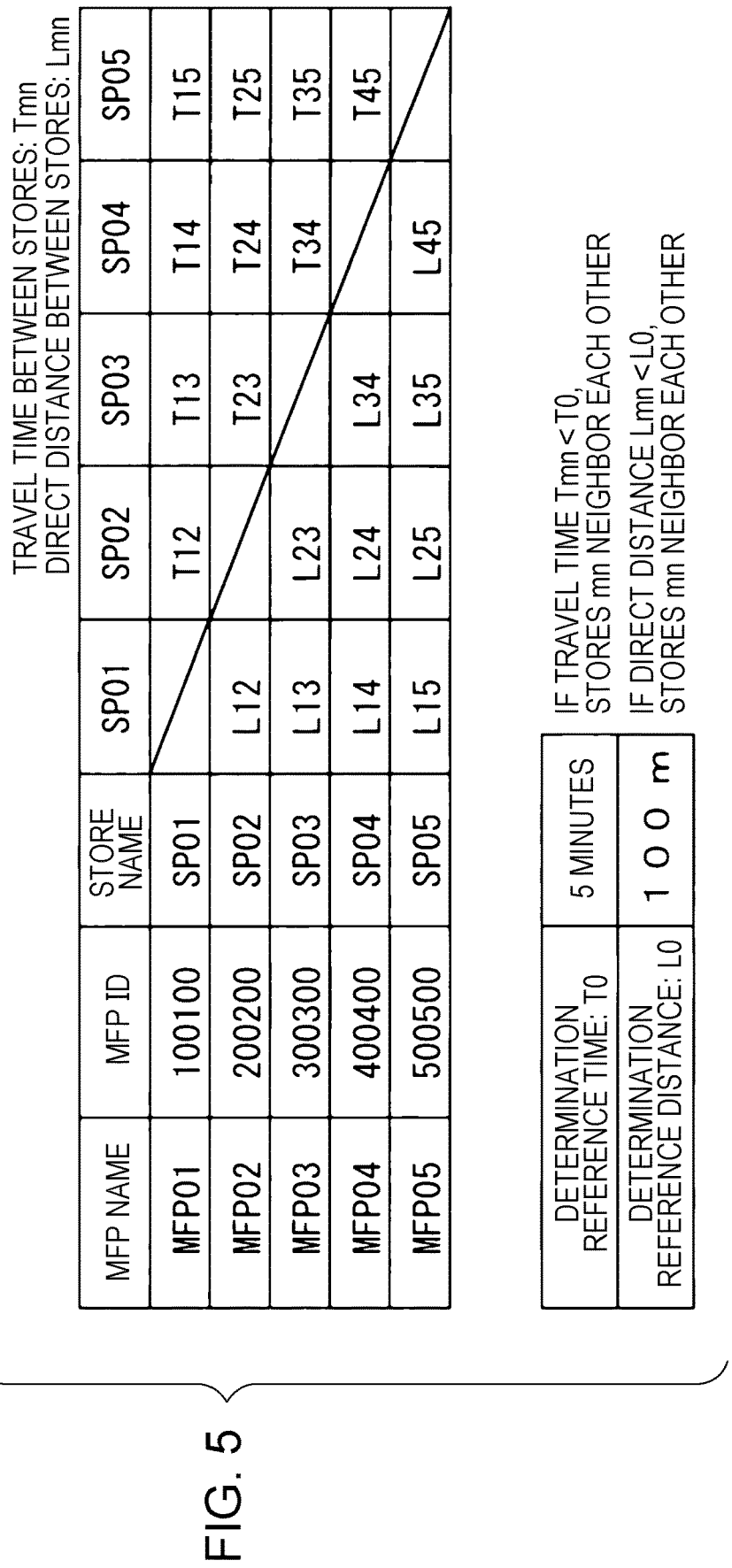
FIG. 5 is an explanatory diagram illustrating one example of information stored in the reboot management device according to the present disclosure.

FIG. 5 is an explanatory diagram illustrating one example of information, namely the MFP positional relationship information 151, stored in the reboot management device according to the present disclosure. Herein, information regarding the positional relationships of five MFPs (MFP01 to MFP05) installed in five stores (SP01 to SP05) is illustrated. Tmn means the travel time between the store SPm, where the device MFPm is installed and the store SPn where the device MFPn is installed, while Lmn means the direct distance between the store SPm where the device MFPm is installed and the store SPn where the device MFPn is installed.

For example, T12 means the travel time between the store SP01 where the device MFP01 having the MFP ID 100100 is installed and the store SP02 where the device MFP02 having the MFP ID 200200 is installed. L34 means the direct distance between the store SP03 where the device MFP03 having the MFP ID 300300 is installed and the store SP04 where the device MFP04 having the MFP ID 400400 is installed.

Also, as illustrated in FIG. 5, the MFP positional relationship information 151 also stores in advance the determination reference time T0 and the determination reference distance L0 that act as bases of reference for determining whether stores neighbor each other. In the case in which the travel time Tmn is less than the determination reference time T0 (Tmn<T0), the store m and the store n are determined to be neighboring. In the case in which the direct distance Lmn is less than the determination reference distance L0 (Lmn<L0), the store m and the store n are determined to be neighboring.

For example, in the case in which 5 minutes is set as the determination reference time T0, and the travel time T45 between the store SP04 and the store SP05 is assumed to be 2 minutes, the store SP04 and the store SP05 are determined to be neighboring. Also, in the case in which 100 m is set as the determination reference distance L0, and the direct distance L45 between the store SP04 and the store SP05 is assumed to be 80 m, the store SP04 and the store SP05 are determined to be neighboring. For the MFPs installed in stores determined to be neighboring, information related to the MFPs (the number of neighboring MFPs and each neighboring MFP ID) is stored in the MFP management information 153.

The offset set time 152 is a time set by taking into account the travel time between stores existing in a predetermined neighboring relationship, and is information that presets a time acting as a basis of reference for offsetting the reboot times of neighboring MFPs. For example, in the case in which a time of 30 minutes is set as the offset set time 152, when offsetting the reboot times of neighboring MFPs, an already set reboot time is changed to a time 30 minutes later.

The MFP management information 153 stores information related to the MFPs being managed, and includes information about one or multiple MFPs being managed and another MFP or MFPs determined to exist in a predetermined neighboring relationship with the one or multiple MFPs. The MFP management information 153 corresponds to the device management information described earlier. For example, the MFP management information 153 stores for each MFP an MFP name, an MFP ID, a store name, the number of neighboring MFPs, and each neighboring MFP ID. However, information other than the above may also be included, and the above information may also be stored together with the reboot management information 154 in a unified manner.

FIG. 6 is an explanatory diagram illustrating one example of the MFP management information 153 stored in the reboot management device according to the present disclosure. The MFP name is a name that identifies an MFP, the MFP ID is a number that identifies the MFP, and the store name is the name of the store where the MFP is installed. The above may be set and input by the administrator of the server SV, for example. By this information, an MFP is specified uniquely. The IP address of an MFP may also be used as information that identifies the MFP.

The number of neighboring MFPs and each neighboring MFP ID is information related to one or more other MFPs existing in a neighboring relationship with the MFP itself. The number of neighboring MFPs means the number of neighboring MFPs determined to exist in a predetermined neighboring relationship with the MFP itself. Each neighboring MFP ID is information that identifies a neighboring MFP determined to exist in a predetermined neighboring relationship with the MFP itself.

In the case in which MFP positional relationship information 151 like that illustrated in FIG. 5 is set, and one or more MFPs existing in a neighboring relationship are detected on the basis of a determination reference like the above, the number of neighboring MFPs and each neighboring MFP ID are set automatically in the MFP management information 153. Alternatively, instead of using the MFP positional relationship information 151, the administrator of the server SV may set the number of neighboring MFPs and each neighboring MFP ID in the MFP management information 153 for multiple MFPs that users are thought to travel between often.

In FIG. 6, for example, in the case in which the devices MFP04 and MFP05 are determined to be neighboring as illustrated in FIG. 2, in the MFP management information 153 for the devices MFP04 and MFP05, the number of neighboring MFPs is set to 1, and the MFP ID of the other MFP is stored as the neighboring MFP ID. Also, in FIG. 6, a case in which three MFPs (MFP90, MFP91, and MFP92) neighbor each other is illustrated, and in the MFP management information 153 for each of these MFPs, the number of neighboring MFPs is set to 2, and the MFP IDs of the other two MFPs are stored as the neighboring MFP IDs. The same applies to the case in which four or more MFPs exist in a neighboring relationship, with the number of neighboring MFPs and each neighboring MFP ID being set accordingly. Note that for an MFP that does not exist in a neighboring relationship with another MFP, the number of neighboring MFPs may be set to 0, and nothing may be set as the neighboring MFP ID.

The reboot management information 154 stores information related to the rebooting of the MFPs being managed, and includes the MFP name, the MFP ID, the store name, the reboot time, and the offset time, for example. However, in the case in which the reboot management information 154 is stored together with the MFP management information 153 in a unified manner, the reboot management information 154 corresponds to the part of the information that includes the reboot time and the offset time.

Additionally, information other than the above may also be included. For example, a monitoring time range corresponding to the MFP monitoring time period described above may also be stored in advance. The monitoring time range means a period for checking whether or not the current time is within a predetermined range with respect to a set reboot time. For example, in the case in which 20 minutes before and after the set reboot time is set as the monitoring time range, and the current time is within this monitoring time range, it is checked whether usage state information transmitted from an MFP is received.

The reboot time means the time at which an MFP is to be rebooted. The offset time means a time offset from the reboot time that acts as a preset basis of reference, and in some cases is set when a neighboring MFP exists. The offset time is set to an initially set value of 0. The case in which the offset time is 0 means that for the corresponding MFP, the reboot time remains the initially set value, and the reboot time is not changed. The case in which the offset time is set to a numerical value other than 0 means that the reboot time set for the corresponding MFP has been changed already, and that the reboot time has been offset by the amount of time set as the offset time. Also, the case in which the offset time is set to a positive numerical value means delaying the reboot time, whereas the case in which the offset time is set to a negative numerical value means advancing the reboot time.

FIGS. 7A and 7B are explanatory diagrams illustrating one example of the reboot management information 154 stored in the reboot management device according to the present disclosure. FIG. 7A illustrates initially set reboot management information 154 in a state in which reboot times have not been set, and in which the reboot times and the offset times are set to zero, for example. FIG. 7B illustrates a state in which the same time (05/05/2017 03:00) has been set as the reboot time of each MFP. If none of the six MFPs (MFP01 to MFP06) illustrated herein exists in a neighboring relationship, the same reboot time (05/05/2017 03:00) is transmitted to these six MFPs, and as a general rule, a reboot is executed in the six MFPs at nearly the same time.

However, in the case in which MFPs in a neighboring relationship exist among the multiple MFPs being managed, an offset determination is made, and the reboot time of any of the MFPs among the MFPs in the neighboring relationship is changed. FIGS. 8A and 8B are explanatory diagrams illustrating one example of the reboot management information 154 stored ho the reboot management device according to the present disclosure. FIG. 8A illustrates the reboot management information 154 in which a reboot time has been set before the offset determination is made, and is the same diagram as FIG. 7B. FIG. 8B illustrates the reboot management information 154 after the offset determination is made, and after a reboot time is changed.

In the case of making the offset determination on the basis of the MFP management information 153 in FIG. 6, since MFP04 and MFP05 are demonstrated to exist in a neighboring relationship, from between MFP04 and MFP05, the reboot time of MFP05 is delayed by the amount of time (for example, 30 minutes) set in the offset set time 152. In this case, in FIG. 8B, the reboot time of MFP04 is the same time as the initial setting (05/05/2017 03:00), but the reboot time of MFP05 is changed to 05/05/2017 03:30, with 30 minutes set as the offset time. In other words, the reboot times of the two MFPs existing in a neighboring relationship are set to different times.

In this way, since the reboot times of MFPs existing in a neighboring relationship are set to different times, in the case in which the MFP in a certain store is rebooting and thus is unusable by the user, when the user travels to the store where another MFP existing in a neighboring relationship is installed, a state in which the other MFP at the destination is also rebooting and thus unusable may be avoided, and user convenience may be ensured.

For example, suppose that there is approximately 3 minutes of travel time between the store SP04 where MFP04 is installed and the store SP05 where MFP05 is installed, the reboot time of MFP04 is set to 05/05/2017 03:00, the reboot time of MFP05 is set to 05/05/2017 03:30, and a reboot takes approximately 20 minutes. In this case, if the user comes to the store SP04 where MFP04 is installed at 3:05, since MFP04 has already starting the reboot, the user is unable to use MFP04. Thus, if the user immediately travels to the store SP05 where the neighboring MFP05 is installed, since the travel time between the stores is approximately 3 minutes, it is conceivable that the user will arrive at the store SP05 on or after 3:08, or by around 3:15 if the user walks slowly.

For example, in the case in which the user arrives at the store SP05 at 3:15, hypothetically, it the start times of the reboot in MFP04 and MFP05 are the same time at 3:00, then the reboot of MFP05 is expected to end at approximately 3:20, and thus the user arriving at the store SP05 at 3:15 is unable to use MFP05 as well. However, in the case in which the reboot time of MFP05 is offset and set to 3:30 as above, at 3:15 when the user arrives at the store SP05, MFP05 has not yet started the reboot and is still in a usable state, and user convenience may be ensured.

FIGS. 9A and 9B are explanatory diagrams illustrating one example of the reboot management information 154 stored in the reboot management device according to the present disclosure. Herein, like in FIG. 8B, the diagram illustrates reboot management information 154 that is re-set in the case in which, after the reboot times of MFPs existing in a neighboring relationship are set to different times, when the reboot time of an MFP approaches, rebooting is unavailable because the MFP is currently in use. FIG. 9A illustrates a state in which the reboot times of the two devices MFP04 and MFP05 existing in a neighboring relationship are exchanged because MFP04 is in use.

For example, suppose that in the case in which the reboot management information 154 has been set like in FIG. 8B, MFP04 is in use 10 minutes before the reboot time of MFP04, namely 3:00. At this point, when the current time becomes 3:00, there is a possibility that MFP04 will still be in use. Accordingly, at the point in time 10 minutes before 3:00, in the case of confirming that the other device MFP05 in the neighboring relationship is not in use, the reboot times of the two devices MFP04 and MFP05 in the neighboring relationship are exchanged. In other words, as illustrated in FIG. 9A, the reboot time of MFP04 is changed to 05/05/2017 03:30, and the offset time is changed to 30 minutes. Also, the reboot time of MFP05 is changed to 05/05/2017 03:00, and the offset time is changed to 0 minutes.

With this arrangement, when the current time reaches 3:00, even if MFP04 is still in use, since the reboot time of MFP04 has been changed to 3:30, in the case in which MFP04 is no longer in use by that time, the reboot of MFP04 is executed at 3:30. Also, although subject to the condition that MFP05 is not being used at 3:00, when the current time reaches 3:00, the reboot of MFP05 is started.

FIG. 9B illustrates the reboot management information 154 in which the reboot time of the MFP with the earlier reboot time is changed because both of the two devices MFP04 and MFP05 existing in a neighboring relationship are currently in use.

For example, suppose that in the case in which the reboot management information 154 has been set like in FIG. 8B, MFP04 is in use 10 minutes before the reboot time of MFP04, namely 3:00. Additionally, assume that at the point in time 10 minutes before 3:00, upon confirming the usage state of the other MFP05 in the neighboring relationship, the other MFP05 is also in use. In this case, if the reboot times of the two devices MFP04 and MFP05 are exchanged, there is possibility that a reboot will be unavailable because MFP05 is still in use at 3:00.

Accordingly, like in FIG. 9B, the reboot time of MFP05 with the later reboot time (3:30) is kept the same, while the reboot time of MFP04 is delayed s lightly and changed from 3:00 to 3:05, for example. At the time of 3:05, there is no guarantee that MFP04 will not be in use, but by delaying the reboot time even slightly, the possibility of being unable to reboot may be decreased.

Also, when the current time reaches 3:00, if MFP04 is still in use, the reboot time of MFP04 may be delayed further, the reboot times of MFP04 and MFP05 may be exchanged, or the reboot time of MFP04 may be changed to a later time than the reboot time of MFP05, such as 4:00, for example.

Detailed processes regarding the setting and changing of reboot times illustrated in FIGS. 7A to 9B will be described later.

Process of Setting and Changing Reboot Times in Reboot Management Device (Server SV)

Example 1

Figure 14:
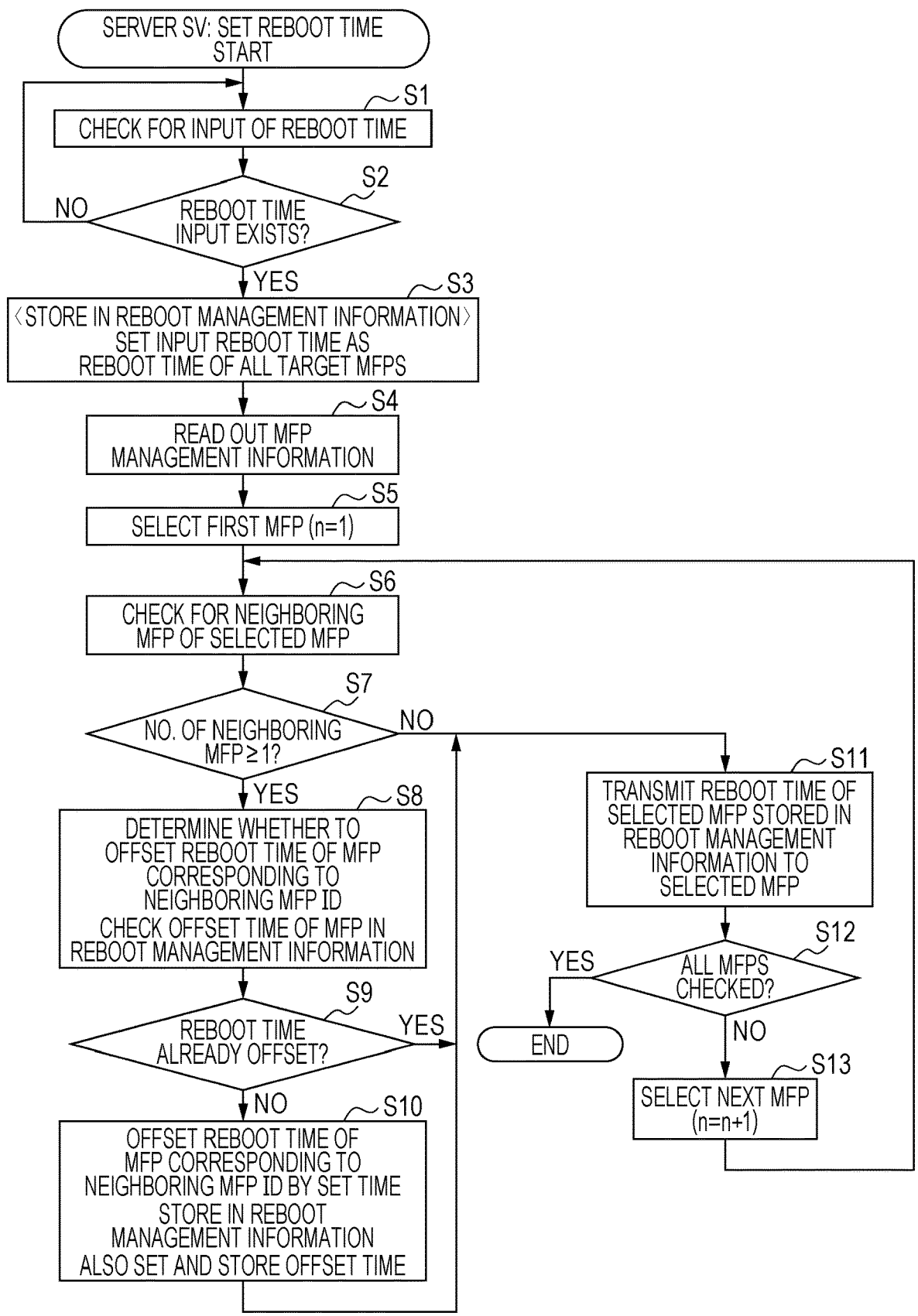
FIG. 14 is a flowchart illustrating one example of a reboot time setting process in the reboot management device according to the present disclosure.

FIG. 14 is a flowchart illustrating one example of a reboot time setting process in the reboot management device (server SV) according to the present disclosure. Herein, an example is described in which, in the server SV, an administrator inputs a reboot time for all MFPs being managed, and after that, the MFP management information 153 is used to set different reboot times for MFPs existing in a neighboring relationship, and the set reboot times are transmitted to each MFP.

In step S1 of FIG. 14, the controller 111 of the server SV checks whether or not a reboot time has been input. In step S2, if a reboot time has been input, the process proceeds to step S3, whereas if not, the process returns to step S1. It is sufficient for the administrator of the server SV to input a reboot time using the operation unit 112. In addition, different reboot times may be input for each MFP being managed. However, in the case of a large number of MFPs being managed, since the input takes time and there is also a possibility of input error, and furthermore since it is thought that there will be little inconvenience to users associated with traveling even if MFPs not existing in a neighboring relationship are set to the same time, it is sufficient to input a single reboot time. In this example, it is assumed that a single reboot time is input.

In step S3, the reboot time setting unit 115 sets the input reboot time as the initial reboot time of all MFPs being managed. In other words, as illustrated in FIG. 7B, the same reboot time is stored as the reboot time in the reboot management information 154. Also, the offset times of all MFPs being managed are set to 0 as an initial value.

In step S4, the controller 111 reads out the MFP management information 153 from the storage unit 150.

In step S5, the first (n=1) MFP in the MFP management information 153 is selected to process the information regarding the first MFP.

In step S6, the offset determination unit 116 checks the number of neighboring MFPs for the MFP selected among the MFP management information 153. Thereafter, in step S7 to step S10, it is determined whether or not to offset the reboot time initially set as above, and if the MFP exists in a neighboring relationship with a reboot time to be offset, the reboot time is offset.

In step S7, if the number of neighboring MFPs with respect to the selected MFP is 1 or more, the process proceeds to step S8, whereas if not, that is if the number of neighboring MFPs is 0, the process proceeds to step S11. Assume that in the case in which the number of neighboring MFPs is 1 or more, the reboot is to be offset, whereas in the case in which the number of neighboring MFPs is 0, the reboot time is not to be offset. Also, in the case in which the number of neighboring MFPs is 1 or more, one or more MFP IDs equal in number to the number of neighboring MFPs are stored as neighboring MFP IDs for the MFP whose number of neighboring MFPs is 1 or more.

In step S8, the offset determination unit 116 executes the reboot time offset determination for each MFP corresponding to the one or more neighboring MFP IDs of the selected MFP. At this point, in the reboot management information 154, the offset time of the MFP corresponding to each neighboring MFP ID is checked. As described above, an offset time of 0 means that the reboot time is not offset and remains at the initially set value, whereas an offset time other than 0 means that the reboot time has been offset already.

In step S9, in the case in which the reboot time has been offset already, that is, in the case in which the offset time is other than 0, the process proceeds to step S11, whereas in the case in which the reboot time has not been offset yet, that is, in the case in which the offset time is 0, the process proceeds to step S10.

In step S10, the reboot time changing unit 117 offsets the reboot time of the MFP corresponding to the neighboring MFP ID of the selected MFP by an amount of time corresponding to the offset set time 152 stored in the storage unit 150. Also, the time corresponding to the offset set time 152 is stored as the offset time of the MFP corresponding to the neighboring MFP ID. After that, the process proceeds to step S11.

For example, in the case in which 30 is stored in the offset set time 152, the reboot time of the MFP corresponding to the neighboring MFP ID is delayed by 30 minutes, and the delayed time is stored as the reboot time in the reboot management information 154 for the MFP. Also, 30 is stored as the offset time of the MFP corresponding to the neighboring MFP ID. This arrangement thereby demonstrates that the reboot time of the MFP is changed.

In the MFP management information 153 of FIG. 6, for MFP04, the number of neighboring MFPs is 1, and 500500 is stored as the neighboring MFP ID, thereby indicating that MFP05 is a neighboring MFP of MFP04, and the reboot time of MFP05 is to be offset. Accordingly, as illustrated in FIG. 8A, although the initial value of the reboot time of the neighboring MFP05 is 05/05/2017 03:00, the reboot time of the neighboring MFP05 is offset by the time (30 minutes) stored in the offset set time 152, and as illustrated in FIG. 8B, changed to 05/05/2017 03:30, and the offset time is changed to 30. By the above process, the reboot times of the two devices MFP04 and MFP05 existing in a neighboring relationship are set to different times.

In step S11, the reboot time notification unit 118 transmits the reboot time of the selected MFP stored in the reboot management information 154 to the selected MFP. The selected MFP receiving the reboot time stores the received reboot time as the reboot information 51.

In step S12, in the case in which all MFPs in the MFP management information 153 have been checked, the process ends. On the other hand, in the case in which an unchecked MFP remains, the process proceeds to step S13, and the next MFP is selected (n=n+1). After that, the process returns to step S6, and the process from steps S6 to S12 above is repeated.

According to the above process, the rebooting of MFPs not in a neighboring relationship may be started at nearly the same time. Furthermore, since MFPs existing in a neighboring relationship are set to different reboot times, rebooting at nearly the same time is avoided, and when a user travels to a neighboring MFP, the rebooting of the neighboring MFP is not being executed, thereby avoiding a situation in which the user is also unable to use the neighboring MFP.

Example 2

Figure 15:
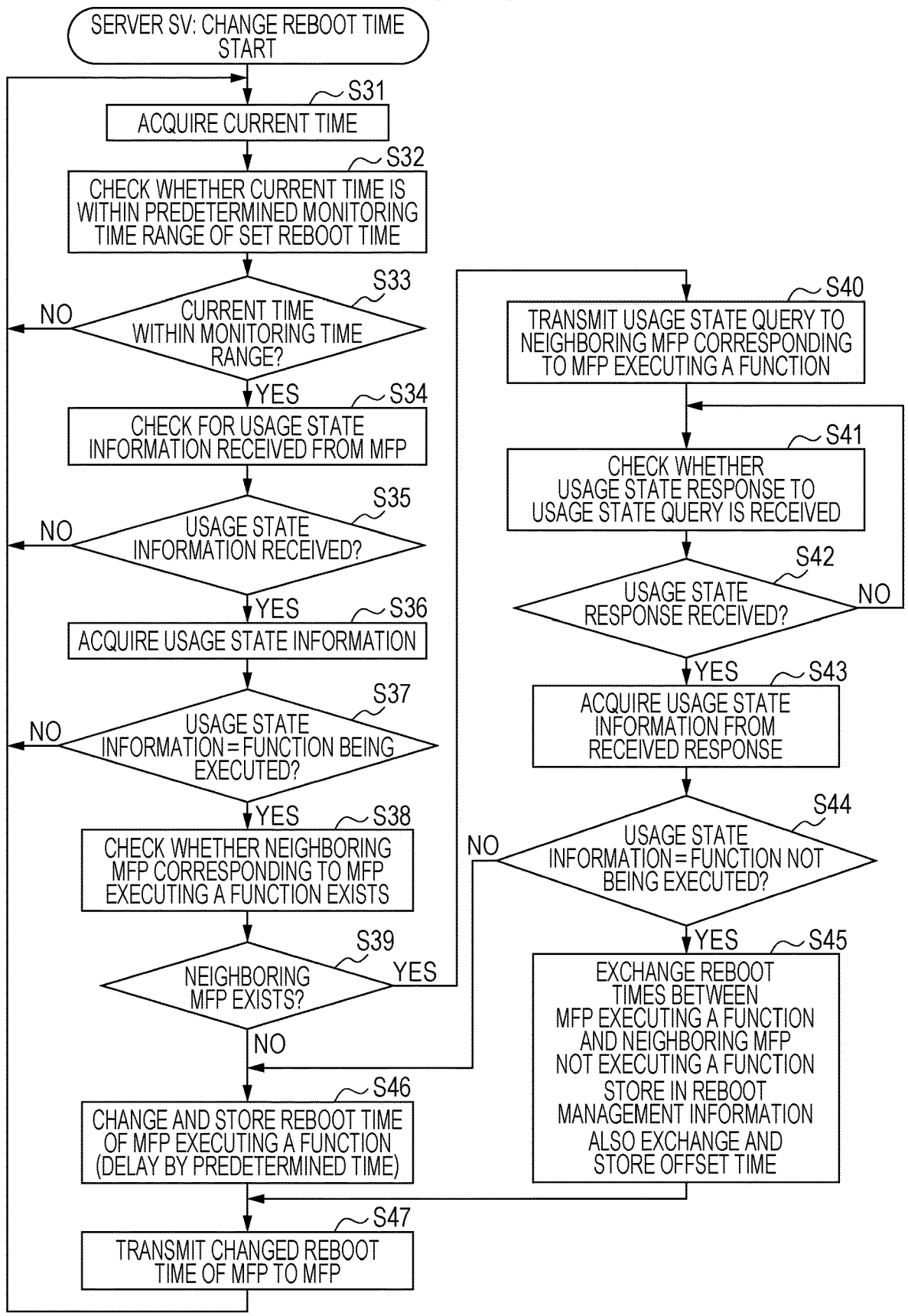
FIG. 15 is a flowchart illustrating one example of a reboot time changing process in the reboot management device according to the present disclosure.

FIG. 15 is a flowchart illustrating one example of a reboot time changing process in the reboot management device (server SV) according to the present disclosure. The following describes a process in which, in the case in which the server SV receives information from an MFP under management, and the information indicates that a function of the MFP is being used, when there is a possibility that a reboot may not be started at the predetermined reboot time, the reboot time of the MFP that has transmitted the information is changed, or alternatively, if there is a neighboring MFP with respect to the MFP that has transmitted the information, the reboot time is exchanged with the neighboring MFP.

In step S31 of FIG. 15, the controller 111 acquires the current time.

In step S32, it is checked whether or not the current time is within a predetermined monitoring time range of the set reboot time.

In step S33, if the current time is within the monitoring time range, the process proceeds to step S34, whereas if not, the process returns to step S31.

In step S34, it is checked whether or not usage state information is received from an MFP being managed.

Assuming that, for example, 20 minutes before and after the set reboot time is set as the monitoring time range, the check for the receiving of usage state information transmitted from an MFP being managed is executed from 20 minutes before the set reboot time until 20 minutes after the reboot time. The monitoring time range is not limited to the above set value, and any period may be set, such as from 10 minutes before the set reboot time until 60 minutes after the reboot time.

The monitoring time range is also a period for checking whether or not an MFP is unable to reboot because of being in use or the like, and examining whether or not to change the reboot time. Also, besides checking if usage state information transmitted from an MFP being managed has been received, in the case in which information indicating a risk that an MFP will be unable to reboot at the reboot time (reboot unavailability information) is receivable from an MFP, a check regarding the receiving of such reboot unavailability information may also be performed. Note that the received usage state information may indicate that a function is being executed, that a function is not being executed, or the like as described earlier, but in the case of receiving usage state information indicating that a function is being executed, it is sufficient to determine that there as a risk of being unable to reboot because a user is using the MFP, and execute the following process.

In step S35, in the case in which usage state information is received, the process proceeds to step S36. Otherwise, the process returns to step S31.

In step S36, the received usage state information is acquired and the contents are checked.

In step S37, in the case in which the acquired usage state information means that a function is being executed, the process proceeds to step S38. Otherwise, that is, in the case in which the usage state information means that a function is not being executed, the process returns to step S31.

In step S38, it is checked whether or not a neighboring MFP corresponding to the MFP that is executing a function exists. At this point, in the MFP management information 153, the number of neighboring MFPs is checked for the MFP that has transmitted the usage state information meaning that a function is being executed, and it is checked whether or not the number of neighboring MFPs is 0.

In step S39, in the case in which a neighboring MFP exists, that is, in the case in which the number of neighboring MFPs not 0, the process proceeds to steep S40. In the case in which a neighboring MFP does not exist, that is, the case in which the number of neighboring MFPs is 0, the process proceeds to step S46.

In step S40, the usage state querying unit 119 transmits a usage state query to the neighboring MFP corresponding to the MFP that is executing a function. At this point, in the MFP management information 153, the neighboring MFP ID with respect to the MFP that has transmitted the usage state information meaning that a function is being executed is checked, and a usage state query is transmitted to the MFP of the stored neighboring MFP ID. In the case in which two or more neighboring MFP IDs are stored, the usage state query is transmitted to all neighboring MFPs. The neighboring MFP receiving the usage state query checks its own usage state, creates a response including the usage state information, and transmits the response to the server SV.

In step S41, the usage state acquisition unit 120 checks whether or not a usage state response to the usage state query has been received.

In step S42, in the case in which a usage state response is received, the process proceeds to step S43. Otherwise, the process returns to step S41.

In step S43, the usage state acquisition unit 120 acquires usage state information from the received usage state response.

In step S44, in the case in which the usage state information indicates that a function is not being executed, the process proceeds to step S45. Otherwise, that is, in the case in which the usage state information indicates that a function is being executed, the process proceeds to step S46. In the case in which there are two or more neighboring MFP IDs, the process proceeds to step S45 if there is even one neighboring MFP that has transmitted a response indicating that a function is not being executed.

In step S45, in the MFP management information 153, the reboot time of the MFP that has transmitting information indicating that a function is being executed and the reboot time of the neighboring MFP that has transmitted information indicating that a function is not being executed are exchanged. Additionally, the offset times are also exchanged. For example, as illustrated in FIGS. 8B and 9A, the reboot times and offset times of the two MFPs existing in a neighboring relationship (MFP04 and MFP05) are exchanged with each other. After that, the process proceeds to step S47.

In the case in which there are no neighboring MFPs, or in the case in which all neighboring MFPs transmit a response indicating that a function is being executed, in step S46, the reboot time of the MFP that has transmitted the usage state information meaning that a function is being executed is changed and stored. For example, the reboot time is delayed by a predetermined amount of time. As illustrated in FIG. 9B, in the case in which all neighboring MFPs (MFP04, MFP05) existing in a neighboring relationship are executing a function, the reboot time of one of the MFPs (MFP04) is delayed by 5 minutes. In this way, by delaying the reboot time of an MFP that is executing a function, the possibility of being unable to reboot may be reduced. However, the amount of time by which to delay the reboot time is not limited to 5 minutes, and it is sufficient to decide the reboot time by taking into account the reboot time of another neighboring MFP, such that the reboot time is not the same as the reboot time of the other neighboring MFP.

In step S47, the changed reboot time is transmitted to the MFP whose reboot time has been changed. After that, the process returns to step S31. The MFP receiving the reboot time stores the received reboot time as the reboot information 51. In this way, for an MFP whose reboot time is approaching, if there is a possibility of being unable to reboot because a user is using the MFP, the reboot time of the MFP is changed, and thus the timing of the reboot may be re-set without inconveniencing the user, while also accounting for any neighboring MFPs.

Process of Acquiring and Inputting Reboot Time and Executing Reboot in Image Forming Device (MFP)

Example 3

Figure 16:
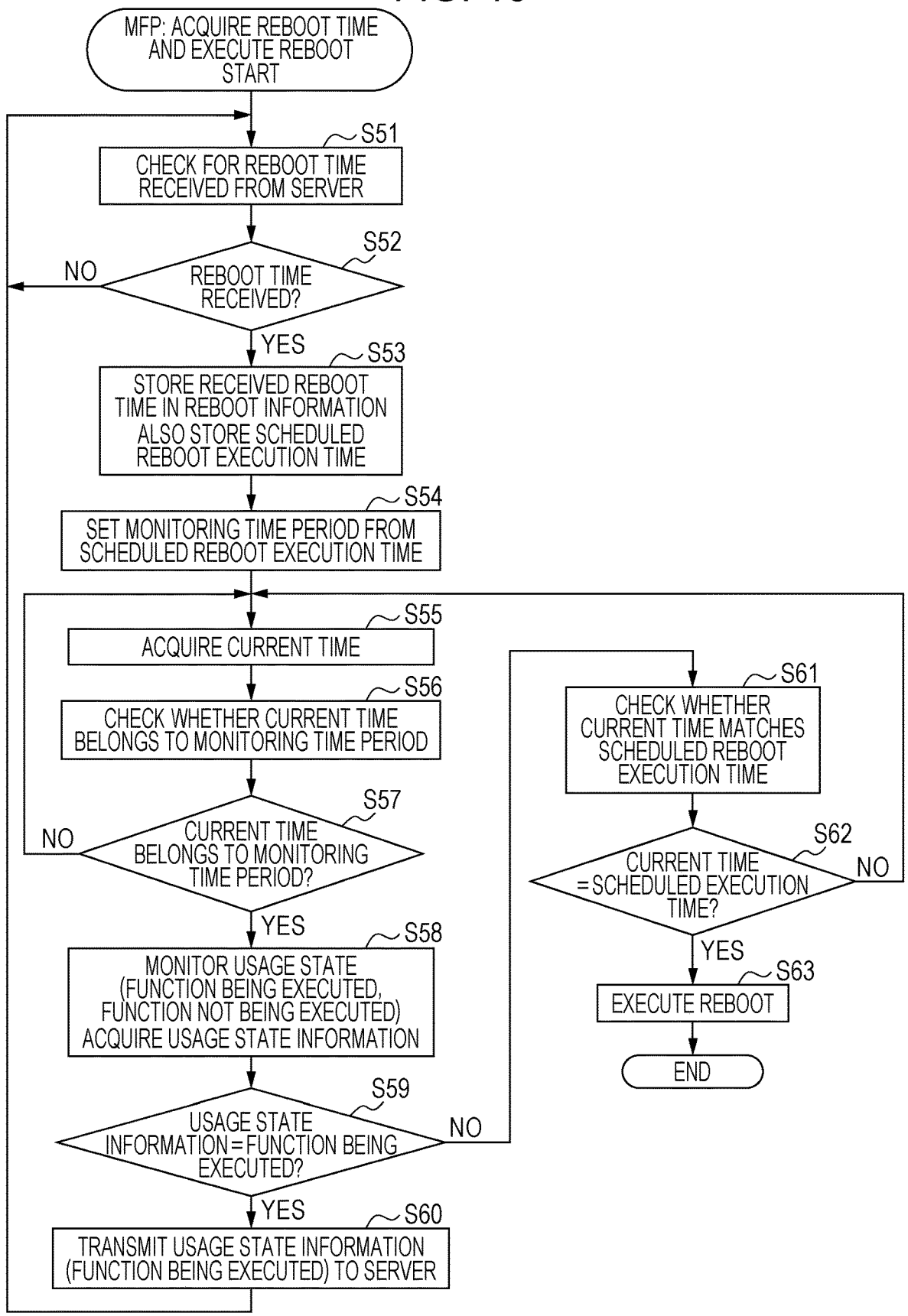
FIG. 16 is a flowchart illustrating one example of a reboot time acquisition and reboot execution process in the image forming device according to the present disclosure.

FIG. 16 is a flowchart illustrating one example of a reboot time acquisition and reboot execution process in the image forming device (MFP) according to the present disclosure. Herein, a process will be described for an MFP in which, in the case in which a reboot time transmitted from the server SV is stored, and there is a possibility of being unable to reboot at the reboot time because a function is being used during the predetermined monitoring time period, the MFP notifies the server SV that a function is being executed and has the server re-set the reboot time, whereas in the case in which a function is not being executed at the reboot time, the reboot is executed.

In step S51 of FIG. 16, the reboot information acquisition unit 20 checks whether a reboot time transmitted from the server SV has been received.

In step S52, if a reboot time has been received, the process proceeds to step S53, whereas if not, the process returns to step S51.

In step S53, the reboot information acquisition unit 20 stores the received reboot time in the reboot information 51 of the storage unit 50. The same received reboot time is also stored in the scheduled reboot execution time of the reboot information 51.

In step S54, the monitoring time period is set from the stored scheduled reboot execution time. For example, a period of several minutes before and after the scheduled reboot execution time is set as the monitoring time period.

In step S55, the current time is acquired by the clock 17.

In step S56, it is checked whether or not the current time belongs to the monitoring time period.

In step S57, if the current time belongs to the monitoring time range, the process proceeds to step S58, whereas if not, the process returns to step S55.

In step S58, the usage state monitoring unit 18 monitors the usage state of the MFP itself. At this point, by checking whether or not a process is being executed by a predetermined program, it is determined whether the usage state of the MFP is a state of executing a function or not executing a function, and usage state information is acquired. Assume that the usage state information indicates either that a function is not being executed, or that a function is being executed.

In step S59, in the case in which the acquired usage state information is that a function is being executed, the process proceeds to step S60. Otherwise, that is, in the case in which the usage state information is that a function is not being executed, the process returns to step S61.

In step S60, the usage state notification unit 19 transmits usage state information indicating that a function is being executed to the server SV. After that, the process returns to step S51.

In step S61, it is checked whether or not the current time matches the scheduled reboot execution time.

In step S62, if the current time matches the scheduled reboot execution time, the process proceeds to step S63, whereas if not, the process returns to step S55.

In step S63, the reboot execution unit 21 executes a reboot, and the process ends. According to the above process, the reboot time set by the server SV is acquired, and in the case in which the MFP is not in a used state during the monitoring time period, a reboot is executed at the acquired reboot time.

Example 4

Figure 17:
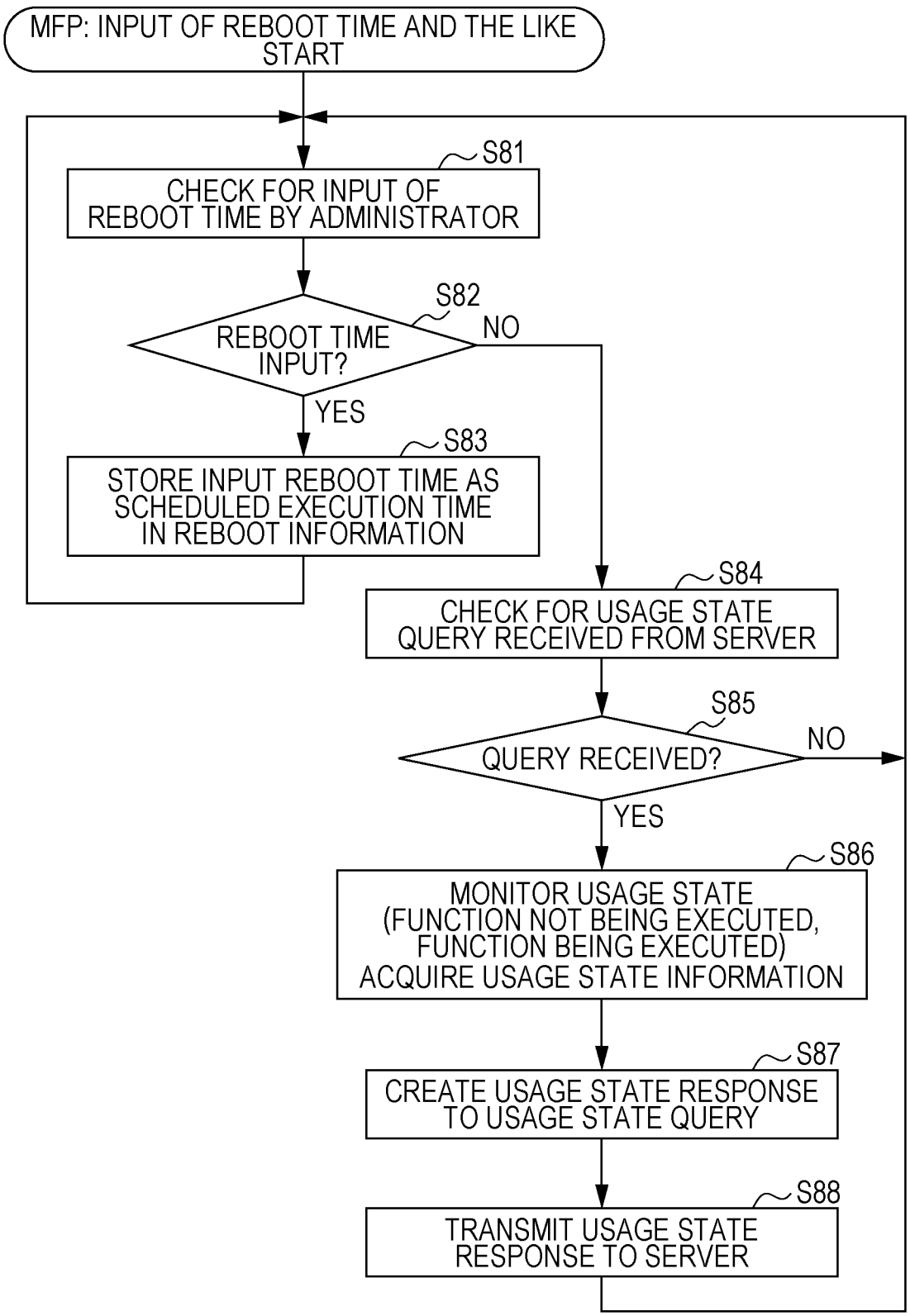
FIG. 17 is a flowchart illustrating one example of a reboot time setting process and the like in the image forming device according to the present disclosure.

FIG. 17 is a flowchart illustrating one example of a reboot time setting process in the image forming device (MFP) according to the present disclosure. Herein, a process of setting a reboot time and a process in the case of a usage state query from the server SV in an MFP will be described. Assume that a manager of a store where the MFP is installed or a maintenance administrator of the system is able to set a reboot time in the MFP.

In step S81 of FIG. 17, the controller 11 checks whether or not a reboot time for the MFP itself has been input by the store manager. The store manager inputs a reboot time manually through the operation unit 12 while looking at a predetermined setting screen displayed on the display 14. FIGS. 13A and 13B are explanatory diagrams illustrating one example of a reboot time setting screen displayed on the display of the image forming device (MFP) according to the present disclosure.

FIG. 13A illustrates a screen displaying the reboot time (time set by the server) transmitted from the server SV. If there is no problem with the displayed time set by the server, it is not necessary to input anything. On the other hand, in the case of wanting to set a reboot time other than the time set by the server, the user inputs a year, month, day, hour, and minute manually in a section for a time set manually. FIG. 13B illustrates a screen in the state in which a manually set time has been input by the store manager. Also, for example, after inputting a manually set time, by selecting a section of the display labeled "Enable manually set time", the input manually set time is stored as the scheduled reboot execution time.

Tn step S82, if a reboot time has been input, the process proceeds to step S83, whereas if not, the process proceeds to step S84.

In step S83, the input reboot time is stored as the scheduled execution time of the reboot information 51. After that, the process returns to step S81.

In step S84, the controller 11 checks whether or not a usage state query has been received from the server SV.

In step S85, if a usage state query has been received from the server SV, the process proceeds to step S86, whereas if not, the process returns to step S81.

In step S86, the usage state monitoring unit 18 monitors the usage state of the MFP itself. At this point, by checking whether or not a process is being executed by a predetermined program, it is determined whether the usage state of the MFP is a state of executing a function or not executing a function, and usage state information is acquired.

In step S87, the usage state notification unit 19 creates a usage state response to the usage state query. The usage state response includes usage state information (information indicating either that a function is not being executed, or that a function is being executed).

In step S88, the usage state notification unit 19 transmits the usage state response to the server SV. After that, the process returns to step S81.

In the above process, input by a store manager and a process in response to receiving a usage state query from the server SV are illustrated, but in the case of receiving information other than the above from the server SV or the case of receiving predetermined information from another MFP, it is sufficient to execute a process corresponding to the received information. For example, information like that illustrated in FIGS. 19 and 20 below may be transmitted and received between MFPs existing in a neighboring relationship.

Process of Adjusting Reboot Times By Image Forming Devices (MFPs)

Example 5

Figure 18:
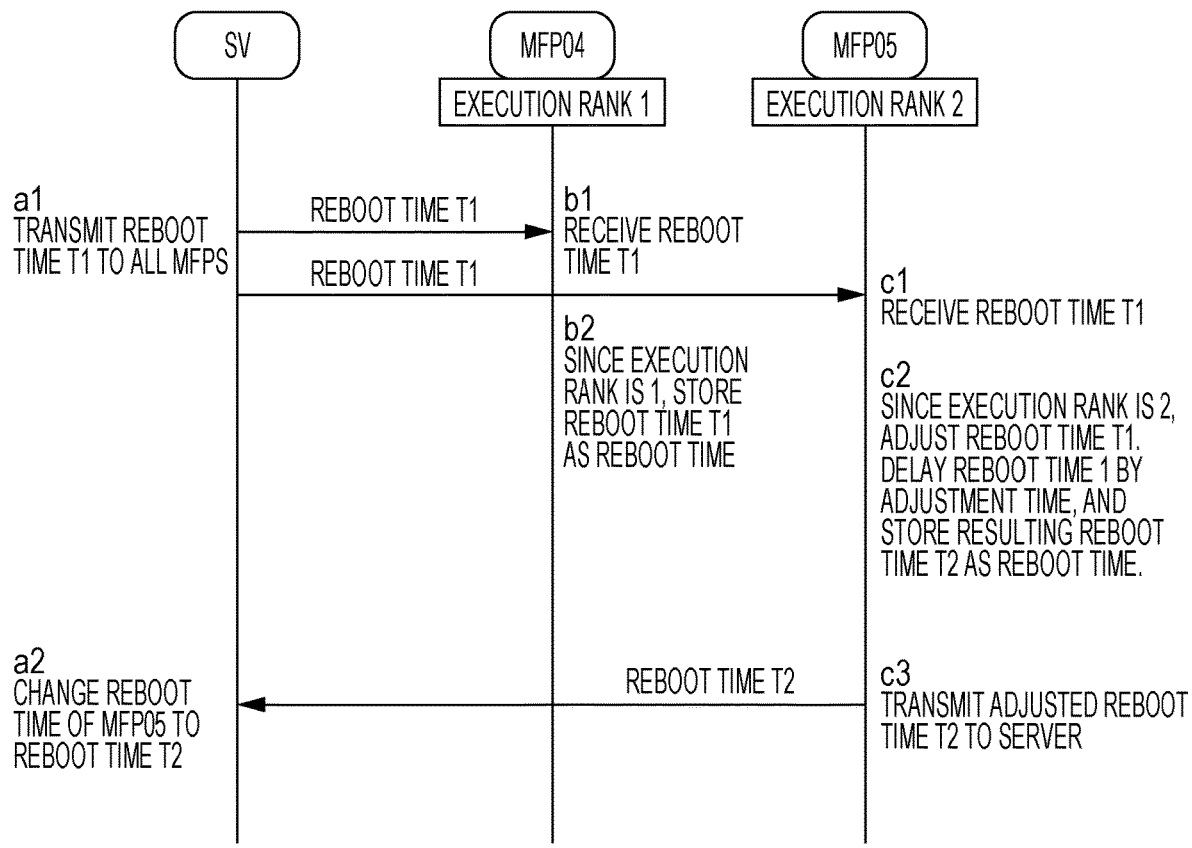
FIG. 18 is a sequence diagram illustrating one example of a reboot time setting process in the image forming device according to the present disclosure.

FIG. 18 is a sequence diagram illustrating one example of a reboot time setting process in image forming devices (MFPs) according to the present disclosure. Herein, a process of setting a reboot time in a neighboring MFP on the basis of the reboot execution rank in the neighboring device information 53 illustrated in FIG. 11 will be described.

For example, the reboot time set in the server SV stored in the storage 50 of an MFP is adjusted on the basis of the execution rank and the adjustment time, such that if the execution rank of the MFP is the highest rank, the same time as the reboot time set by the server SV is set as the scheduled reboot execution time, and as the execution rank goes lower, a later time after the reboot time set by the server SV is set as the scheduled reboot execution time.

Assume that, as illustrated in FIGS. 2 and 6, MFP04 and MFP05 exist in a neighboring relationship, and the reboot times of neighboring MFPs are set on the basis of the reboot execution ranking of the two. Also, assume that the neighboring device information 53 illustrated in FIG. 11 is stored in advance in each of MFP04 and MFP05. Assume that MFP04 is ranked first by reboot execution rank, and MFP05 is ranked second by reboot execution rank. Note that in the sequence of FIG. 18, since the reboot times of neighboring MFPs are set on the basis of the reboot execution ranking, data communication does not have to occur between the neighboring MFPs.

In step a1 of FIG. 18, the server SV transmits a reboot time T1 to all MFPs.

In step b1, MFP04 receives the reboot time T1. Also, in step c1, MFP05 also receives the same reboot time T1. In step b2, since MFP04 has a reboot execution rank of 1, the reboot time T1 is stored directly as the scheduled reboot execution time of MFP04.

In step c2, since MFP05 has a reboot execution rank of 2, the reboot time T1 is adjusted. The reboot time T1 is adjusted by utilizing the adjustment time (30 minutes) in the neighboring device information 53 stored in MFP05. In other words, in MFP05, a reboot time T2 obtained by delaying the reboot time T1 by the adjustment time (30 minutes) in the neighboring device information 53 is stored as the scheduled reboot execution time of MFP05.

In step c3, the adjusted reboot time T2 is transmitted to the server SV. In step a2, the server SV changes the reboot time of MFP05 to the received reboot time T2, and stores the changed reboot time in the reboot management information 154. With this arrangement, the neighboring MFP05 is able to use the initial reboot time transmitted from the server SV and the preset adjustment time to adjust the reboot time of MFP05 itself, without having the server SV execute a process of changing the reboot time of MFP05.

FIG. 18 illustrates an example in which there are two neighboring MFPs, but even in cases in which three or more MFPs exist in a neighboring relationship, by executing a similar process, the reboot time in each neighboring MFP may be adjusted. Also, having each of the neighboring MFPs transmit and receive the adjusted reboot times with each other, it is possible to adjust the reboot times between neighboring MFPs.

Example 6

Figure 19:
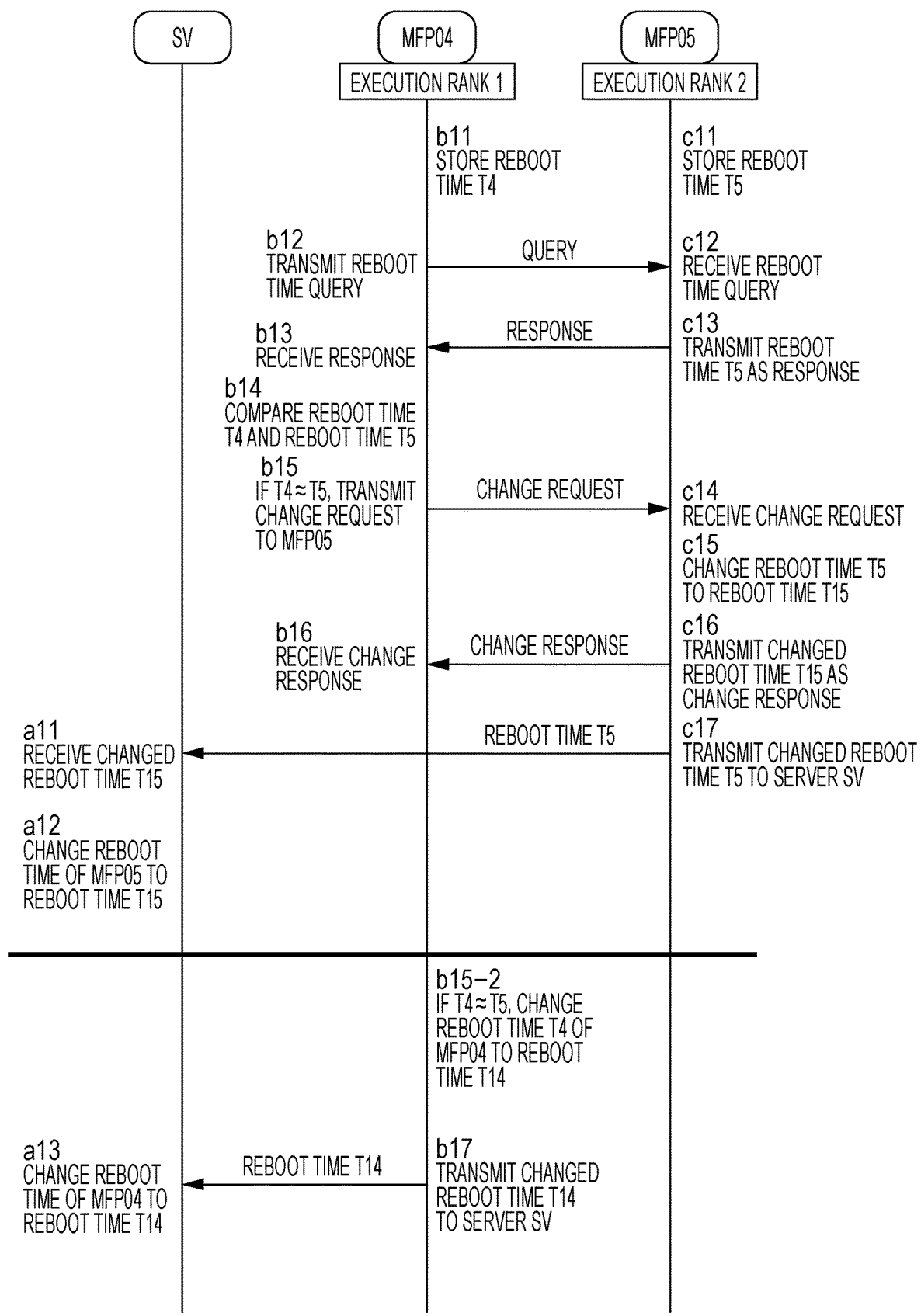
FIG. 19 is a sequence diagram illustrating one example of a reboot time setting process in the image forming device according to the present disclosure.

FIG. 19 is a sequence diagram illustrating one example of a reboot time setting process in image forming devices (MFPs) according to the present disclosure. Herein, unlike FIG. 18, a process of setting a reboot time in a neighboring MFP by communicating data between neighboring MFPs will be described. Likewise in FIG. 19, assume that, as illustrated in FIGS. 2 and 6, MFP04 and MFP05 exist in a neighboring relationship, and the neighboring device information 53 illustrated in FIG. 11 is stored in advance in each of MFP04 and MFP05. In other words, assume that each of MFP04 and MFP05 understands that its neighboring MFP is MFP05 and MFP04, respectively.

Also, in step b11, assume that in MFP04, a reboot time T4 already is being stored due to manual input by a manager of the store SP04 where MFP04 is installed. Furthermore, in step c11, assume that in MFP05, a reboot time T5 already is being stored due to manual input by a manager of the store SP05 where MFP05 is installed. Assume that the reboot time T4 and the reboot time T5 are the same time, or times close enough to each other (for example, times that are 1 minute apart) such that adjustment is desirable. Also assume that the reboot time T4 and the reboot time T5 already have been transmitted to the server SV, and are being stored as the reboot times of the respective MFPs in the server SV.

In step b12, information querying the reboot time is transmitted from MFP04 having an execution rank of 1 to the neighboring MFP05. In step c12, the neighboring MFP05 receives the information querying the reboot time. In step c13, the neighboring MFP05 transmits its own reboot time T5 already being stored to MFP04 as a response. In step b13, MFP04 receives the response.

In step b14, MFP04 compares its own reboot time T4 to the reboot time T5 of MFP05 included in the response. In step b15, in the case in which the reboot time T4 and the reboot time T5 are nearly the same time, a reboot time change request is transmitted to the neighboring MFP05. However, if the reboot time T4 and the reboot time T5 are far enough apart that adjustment is unnecessary, it is sufficient to end the process at this point in time without transmitting anything.

In step c14, the neighboring MFP05 receives the reboot time change request. In step c15, the neighboring MFP05 uses the adjustment time in the neighboring device information 53 to change the reboot time T5 to a reboot time T15. For example, the time is changed to a time 30 minutes later.

In step c16, the neighboring MFP05 transmits the changed reboot time T15 to MFP04 as a change response. In step b16, MFP04 receives the change response. With this arrangement, MFP04 confirms that the reboot time of the neighboring MFP05 has been changed to the time T15 different from the reboot time T4.

In step c17, the neighboring MFP05 transmits the changed reboot time T15 to the server SV. In step a11, the server SV receives the changed reboot time T15 of the neighboring MFP05. In step a12, the server SV changes the reboot time of the neighboring MFP05 to the reboot time T15, and stores the reboot time T15. By the above process, the reboot time of the neighboring MFP05 having the lower execution rank is adjusted.

However, rather than adjusting the reboot time of MFP05 having the lower execution rank, the reboot time of MFP04 having the higher execution rank may be adjusted. In this case, instead of step b15 above, in a step b15-2, MFP04 uses the adjustment time in the neighboring device information 53 to change the reboot time T4 of MFP04 itself to a reboot time T14. For example, the time is changed to a time 30 minutes later. In step b17, MFP04 transmits the changed reboot time T14 to the server SV. In step a13, the server SV receives the changed reboot time T14 of MFP04, changes the reboot time of MFP04 to the reboot time T14, and stores the reboot time T14.

According to a process like the above, in the server SV, the reboot time of one of the neighboring MFPs is adjusted by data communication between the neighboring MFPs, without having the server SV execute a process of changing the reboot time of a neighboring MFP.

FIG. 19 illustrates an example in which there are two neighboring MFPs, but even in the case in which three or more MFPs exist in a neighboring relationship, by executing a similar data communication process between neighboring MFPs in which close reboot times are set, the reboot times of the neighboring MFPs are changed to be different from each other, making it possible to address a situation in which a user who travels between neighboring MFPs is unable to use an MFP because the MFP is being rebooted.

Example 7

Figure 20:
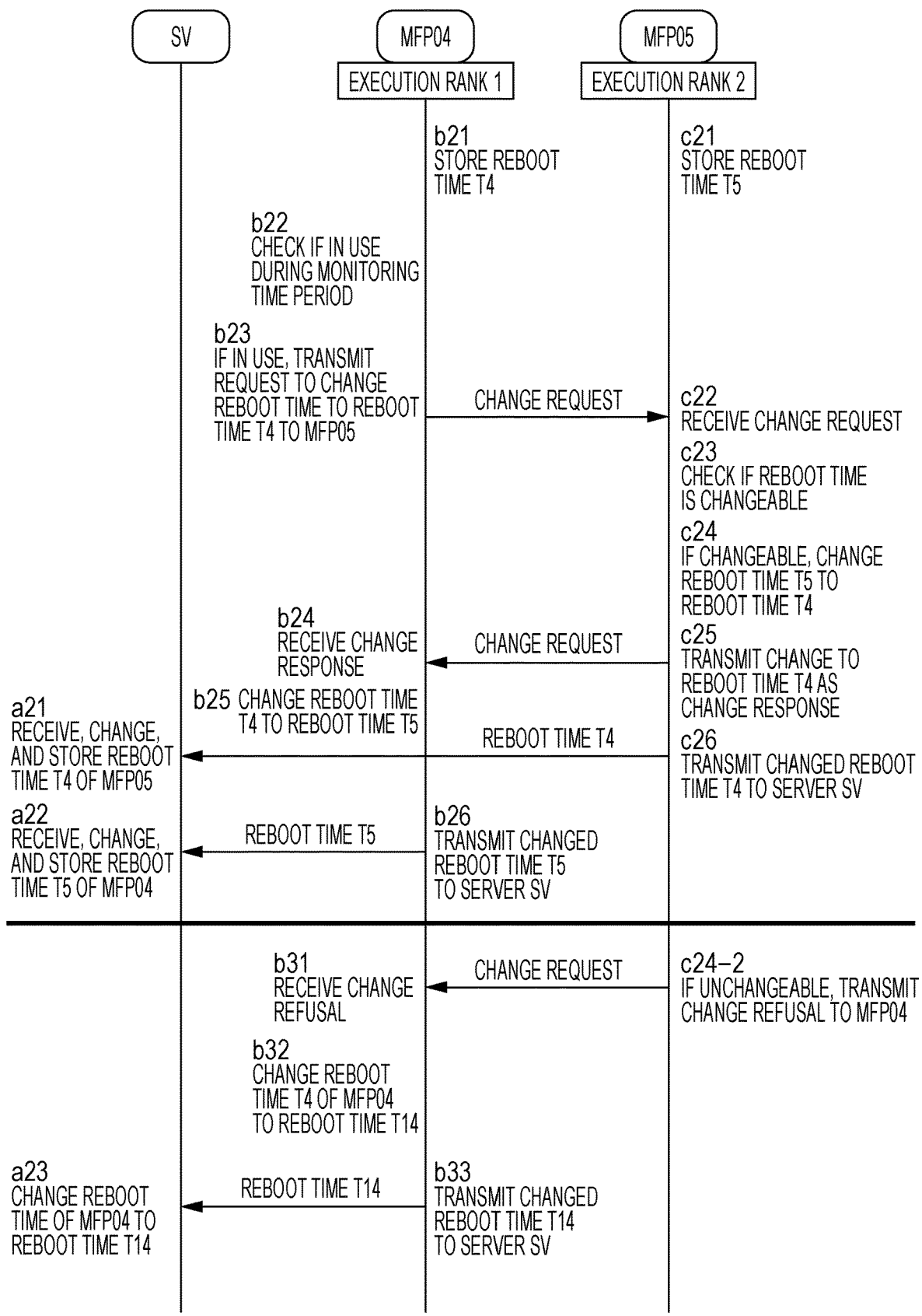
FIG. 20 is a sequence diagram illustrating one example of a reboot time setting process in the image forming device according to the present disclosure.

FIG. 20 is a sequence diagram illustrating one example of a reboot time setting process in image forming devices (MFPs) according to the present disclosure. Unlike FIG. 19, the following describes a process in which, in the case in which one or both of two neighboring MFPs are in use during the monitoring time period, the reboot times of the neighboring MFPs are changed by communicating data between the neighboring MFPs.

For example, in the case in which the usage state monitoring unit 16 determines that an MFP is executing a function during a predetermined monitoring time period that includes the scheduled reboot execution time stored in the storage 50 of the MFP, the communication unit 15 transmits change request information requesting a change to the scheduled reboot, execution time to another MFP existing in a predetermined neighboring relationship. After that, if a change response indicating that the scheduled reboot execution time of the other MFP is changeable is received from the other MFP in the neighboring relationship, the stored scheduled reboot execution time and the scheduled reboot execution time of the other MFP are exchanged Alternatively, in the case of receiving a change response indicating that the reboot time is unchangeable from the other MFP in the neighboring relationship, the stored scheduled reboot execution time is changed on the basis of the adjustment time to a time separated from the scheduled reboot execution time of the other MFP by a predetermined amount of time or more.

Likewise in FIG. 20, assume that, as illustrated in FIGS. 2 and 6, MFP04 and MFP05 exist in a neighboring relationship, and the neighboring device information 53 illustrated in FIG. 11 is stored in advance in each of MFP04 and MFP05. In other words, assume that each of MFP04 and MFP05 understands that its neighboring MFP is MFP05 and MFP04, respectively.

Also, in step b21, assume that in MFP04, a reboot time T4 already is being stored due to manual input by a manager of the store SP04 where MFP04 is installed. Furthermore, in step c21, assume that in MFP05, a reboot time T5 already is being stored due to manual input by a manager of the store SP05 where MFP05 is installed.

In FIG. 20, unlike FIG. 19, assume that the offset time is taken into account and that the reboot time T4 and the reboot time T5 already have been set to times separated by approximately 30 minutes or more. Also assume that the reboot time T4 and the reboot time T5 already have been transmitted to the server SV, and are being stored as the reboot times of the respective MFPs in the server SV.

In step b22, MFP04 checks whether or not the MFP04 itself is in use by a user (executing a function) during the monitoring time period. In other words, when the reboot time T4 approaches, it is checked whether or not a predetermined function of MFP04 is being used by a user. In step b23, in the case in which MFP04 is currently in use by a user, since there is a possibility of being unable to reboot when the reboot time T4 arrives, MFP04 transmits information (change request information) requesting the neighboring MFP05 to chance its reboot time to the reboot time T4.

In step c22, MFP05 receives the change request. In step c23, MFP05 checks whether or not its own reboot time is changeable. In other words, in MFP05, it is checked whether or not a predetermined function of MFP05 is currently being used by a user. If a predetermined function is being used, it is determined that MFP05 is unable to change its own reboot time, whereas if a predetermined function is not being used, it is determined that MFP05 is able to change its own reboot time.

In step c24, in the case of determining that MFP05 is able to change its own reboot time, MFP05 changes its own reboot time from the reboot time T5 to the reboot time T4. In step c25, MFP05 transmits a change response to MFP04 indicating that the reboot time of MFP04 is changeable to the reboot time T5, and that the reboot time of MFP05 itself has been changed to the reboot time T4. In step b24, MFP04 receives the change response. In step b25, MFP04 changes its own reboot time from the reboot time T4 to the reboot time T5.

In step c26, MFP05 transmits the changed reboot time T4 to the server SV. In step a21, the server SV receives the changed reboot time T4 of MFP05, changes the reboot time of MFP05 to the reboot time T4, and stores the reboot time T4. In step b26, MFP04 transmits the changed reboot time T5 to the server SV. In step a22, the server iv receives the changed reboot time T5 of MFP04, changes the reboot time of MFP04 to the reboot time T5, and stores the reboot time T5.

According to the above process, in the case in which there is a possibility that one neighboring MFP will be unable to reboot because the MFP is in use, the neighboring MFPs exchange reboot times with each other, making it possible to reduce the possibility that the neighboring MFP that may be unable to reboot is unable to reboot.

On the other hand, in step c23, when MFP05 checks whether or not its own reboot time is changeable, assume that since a predetermined function of MFP05 is currently being executed by a user, MFP05 is unable to change its own reboot time. In this case, in step c24-2, MFP05 transmits a change response indicating that the reboot time is unchangeable to MFP04. In step b31, MFP04 receives the change response indicating that the reboot time is unchangeable.

In step b32, MFP04 uses the adjustment time in the neighboring device information 53 to change (delay) its own reboot time from the reboot time T4 to the reboot time T14. In step b33, MFP04 transmits the changed reboot time T14 to the server SV. In step a23, the server SV receives the changed reboot time T14 of MFP04, changes the reboot time of MFP04 to the reboot time T14, and stores the reboot time T14.

According to the above process, in the case in which there is a possibility that one neighboring MFP will be unable to reboot because the MFP is in use, and furthermore there is a possibility that the other neighboring MFP is also unable to reboot because the MFP is in use, only the reboot time of one of the neighboring MFPs is changed, making it possible to reduce the possibility that the one neighboring MFP will be unable to reboot, while leaving the possibility that the other neighboring MFP may be unable to reboot.

FIG. 20 illustrates an example in which there are two neighboring MFPs, but even in cases in which three or more MFPs exist in a neighboring relationship, by confirming the usage state of each neighboring MFP and executing a similar process, the reboot time of each neighboring MFP may be changed and the possibility of being unable to reboot may be reduced.

The present disclosure contains subject matter related to that disclosed in Japanese Priority Patent Application JP 2017-214607 filed in the Japan Patent Office on Nov. 7, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reboot control system comprising:
    an information processing device; and
    a reboot management device, connected to the information processing device over a network, that manages a reboot time of the information processing device, wherein
    the reboot management device includes
        a first storage unit that stores device management information including information related to one or a plurality of information processing devices being managed, and another information processing device determined to exist in a predetermined neighboring relationship with the information processing device,
        a reboot time setting unit that sets a reboot time at which to reboot the information processing device based on the device management information, and
        a reboot time notification unit that transmits the set reboot time to each information processing device, and
    the information processing device includes
        a reboot information acquisition unit that acquires a reboot time transmitted from the reboot management device, and
        a reboot execution unit that executes a reboot at the acquired reboot time, and
    the reboot time setting unit takes into account a positional relationship of a plurality of information processing devices existing in the predetermined neighboring relationship to set the reboot times of the plurality of information processing devices existing in the predetermined neighboring relationship to mutually different times.

2. The reboot control system according to claim 1, wherein
    each information processing device is installed in a respective store, and
    in a case in which a travel time between any two stores where the information processing devices are installed is shorter than a predetermined determination reference time, or in a case in which a direct distance between any two stores is shorter than a predetermined determination reference distance, the information processing devices installed in the two stores are determined to exist in the predetermined neighboring relationship.

3. The reboot control system according to claim 2, wherein
    the first storage unit stores in advance an offset set time that is set by taking into account the travel time between stores existing in a predetermined neighboring relationship, and
    with regard to the reboot times of a plurality of information processing devices existing in the predetermined neighboring relationship, the reboot time setting unit sets reboot times offset from each other by the offset set time.

4. The reboot control system according to claim 1, wherein the information processing device additionally includes
a usage state monitoring unit that monitors whether or not a predetermined implemented function is being executed, and in a case in which the predetermined function is being executed, determines that the information processing device is executing a function, or in a case in which the predetermined function is not being executed, determines that the information processing device is not executing a function, and
a usage state notification unit that transmits current usage state information determined by the usage state monitoring unit to the reboot management device, and the reboot management device additionally includes
a usage state acquisition unit that acquires the current usage state information transmitted from the information processing device, and
a reboot time changing unit that changes the reboot time of the information processing device, and in a case in which the usage state acquisition unit acquires usage state information indicating that a function is being executed from a first information processing device, the reboot time changing unit delays by a predetermined amount of time the reboot time of the first information processing device that transmitted the usage state information indicating that a function is being executed, or in a case in which a second information processing device existing in a neighboring relationship with the first information processing device exist, the reboot time changing unit exchanges the reboot times of the first information processing device and the second information processing device with each other.

5. The reboot control system according to claim 1, wherein the information processing device additionally includes
an operation unit that inputs and sets a reboot time of the information processing device itself, and
a second storage unit that stores the set reboot time as a scheduled reboot execution time, and
the reboot execution unit executes a reboot at a reboot time stored as the scheduled reboot execution time.

6. The reboot control system according to claim 1, wherein for each information processing device, a number of neighboring information processing devices determined to exist in a predetermined neighboring relationship with the information processing device and information that identifies each neighboring information processing device are additionally stored in the device management information.

7. The reboot control system according to claim 1, wherein the information processing device is an image forming device including any one or more functions from among a function of inputting image information, a function of printing image information, and a function of forwarding image information to another information processing device or a storage medium.

8. An information processing device comprising:
a reboot information acquisition snit that acquires a reboot time set by a reboot management device and a reboot time set in an other information processing device;
a storage unit that stores reboot information including the reboot time set by the reboot management device and a scheduled reboot execution time, and neighboring device information including information that identifies the other information processing device existing in a predetermined neighboring relationship and an adjustment time for adjusting the reboot time; and
a reboot execution unit that executes a reboot at the scheduled reboot execution time, wherein
in a case in which the reboot time acquired from the other information processing device existing in the predetermined neighboring relationship and the scheduled reboot execution time stored in the storage unit are approximately the same, based on the adjustment time, the scheduled reboot execution time stored in the storage unit is changed to a time separated from the reboot time acquired from the other information processing device by a predetermined amount of time or greater, or the other information processing device is requested to change the reboot time acquired from the other information processing device.

9. An information processing device comprising:
a reboot information acquisition unit that acquires a reboot time set by a reboot management device;
a storage unit that stores
reboot information including the reboot time set by the reboot management device and a scheduled reboot execution time, and
neighboring device information including information that identifies an other information processing device existing in a predetermined neighboring relationship, an execution rank that indicates an order in which to execute rebooting in a case of consecutively rebooting a plurality of information processing devices existing in a neighboring relationship, and an adjustment time for adjusting the reboot time; and
a reboot execution unit that executes a reboot at the scheduled reboot execution time, wherein
the reboot time set by the reboot management device stored in the storage unit is adjusted based on the execution rank and the adjustment time, such that if the execution rank is a highest rank, a same time as the reboot time set by the reboot management device is set as the scheduled reboot execution time, and as the execution rank becomes lower, a time later than the reboot time set by the reboot management device is set as the scheduled reboot execution time.

10. An information processing device comprising:
a reboot information acquisition unit that acquires a reboot time set by a reboot management device and a reboot time set in an other information processing device;
a storage unit that stores
reboot information including the reboot time set by the reboot management device and a scheduled reboot execution time, and
neighboring device information including information that identifies an other information processing device existing in a predetermined neighboring relationship and an adjustment time for adjusting the reboot time;
a reboot execution unit that executes a reboot at the scheduled reboot execution time;
a usage state monitoring unit that monitors whether or not a predetermined implemented function is being executed, and in a case in which the predetermined function is being executed, determines that the in processing device is executing a function, or in a case in which the predetermined function is not being executed, determines that the information processing device is not executing a function; and a communication unit that communicates with the other information processing device, wherein in a case in which the usage state monitoring unit determines that the information processing device is executing a function during a predetermined monitoring time period that includes the stored scheduled reboot execution time, the communication unit transmits change request information requesting a change to the scheduled reboot execution time to the other information processing device existing in the predetermined neighboring relationship, and then in a case of receiving a change response indicating that the scheduled reboot execution time of the other information processing device is changeable from the other information processing device existing in the neighboring relationship, the stored scheduled reboot execution time and the scheduled reboot execution time of the other information processing device are exchanged, or in a case of receiving a change response indicating that the scheduled reboot execution time of the other information processing device is unchangeable from the other information processing device existing in the neighboring relationship, based on the adjustment time, the stored scheduled reboot execution time is changed to a time separated from the scheduled reboot execution time of the other information processing device by a predetermined amount of time or more.

11. A reboot management device that manages a reboot time of one or a plurality of information processing devices, comprising:

a storage unit that stores device management information including information related to one or a plurality of information processing devices being managed, and another information processing device determined to exist in a predetermined neighboring relationship with the information processing device;

a reboot time setting unit that sets a reboot time at which to reboot the information processing device based on the device management information; and a reboot time notification unit that transmits the set reboot time to each information processing device; wherein the reboot time setting unit takes into account a positional relationship of a plurality of information processing devices existing in the predetermined neighboring relationship to set the reboot times of the plurality of information processing devices existing in the predetermined neighboring relationship to mutually different times.

12. A reboot control method of a reboot control system in which an information processing device and a reboot management device that manages a reboot time of the information processing device are connected over a network, the reboot control method comprising:

causing the reboot management device to store device management information including information related to one or a plurality of information processing devices being managed and another information processing device determined to exist in a predetermined neighboring relationship with the information processing device, and based on the stored device management information, set a reboot time at which to reboot the information processing device, and transmit the set reboot time to each information processing device; and causing the information processing device to acquire the reboot time transmitted from the reboot management device, and execute a reboot at the acquired reboot time, wherein the setting of the reboot time takes into account a positional relationship of a plurality of information processing devices existing in the predetermined neighboring relationship to set the reboot times of the plurality of information processing devices existing in the predetermined neighboring relationship to mutually different times.

* * * * *